INVENTORS
WILLIAM F. BEAUSOLEIL
JAMES D. CALVERT
ANDRIS PADEGS
BY Joseph C. Redmond, Jr.
ATTORNEY

NOTE THIS OUTPUT USED IF THIS CONTROL UNIT DOES NOT HAVE THE LOWEST PRIORITY.

NOTE THIS OUTPUT USED IF THIS CONTROL UNIT HAS THE LOWEST PRIORITY.

United States Patent Office
3,336,582
Patented Aug. 15, 1967

3,336,582

INTERLOCKED COMMUNICATION SYSTEM

William F. Beausoleil, James D. Calvert, and Andris Padegs, Poughkeepsie, N.Y., assignors to International Business Machines Corporation, New York, N.Y., a corporation of New York Filed Sept. 1, 1964, Ser. No. 393,611
31 Claims. (Cl. 340—172.5)

ABSTRACT OF THE DISCLOSURE

A communication system which connects input/output (*I/O*) devices of differing data rates with a data processing system. The communication system is organized to cause data transfer in either burst mode—where an *I/O* device transmits all its information without interruption from other devices—or multiplex mode—where only a portion of information is transmitted in a priority relation with other *I/O* devices. Operation proceeds on an interlocked basis. Statements—data, commands, status addresses—initiate corresponding responses—data, address or status—from a connected device.

The system includes priority selection apparatus for maintaining a priority relationship among the different *I/O* devices.

This invention relates to communication systems. More particularly, this invention relates to communication systems interconnecting data processing systems and terminal units.

Data processing systems include central processing units (CPU) and storage for executing a series of planned actions and operations upon information to achieve a desired result. The data processing system requires, as a necessary part of information-handling ability, features than can enter data into the system and record data from the system. It also needs, in addition, a storage directly addressable by the CPU for storing large volumes of data. These functions are performed by input-output (*I/O*) devices linked directly to the system by means of a communication system or interface.

*I/O* devices handle a wide variety of data forms, i.e., punched card, tape, real-time and the like. Generally, the devices have different operating characteristics, data rates, and types of operation, e.g., burst or multiplex modes. Normally, each *I/O* device has a unique communication system which provides connection to the data processing system. The communication system or interface may or may not be shared by other like devices. In the case of unlike *I/O* devices, however, special networks or adapters are required to connect the different devices to the interface.

Presently, therefore, it is necessary to have a variety of interfaces and adapters to assemble completely a data processing system. The various adapters and interfaces limit the flexibility of data processing systems, especially when it is desired to have each system compatible with other systems of lower or higher capability. Operations performed by *I/O* devices in one system may not be executed in another system due to the characteristics of the interface. Additionally, the various interfaces require more complex programming in order to operate the system effectively. It is desirable, therefore, to provide a communication link between a data processing system and terminal units, typically *I/O* devices, the link permitting regular operation of all devices with a family of data processing systems without any requirement for special networks or adapters.

A general object of the present invention is a communication system for a family of data processing systems.

One object is a communication system which permits *I/O* devices and data processing systems of any data rates to be interconnected.

Another object is a communication system whereby data, instructions and addressing occur on a single set of lines.

Another object is a communication system that selects among several terminal units requiring the service of the system.

Another object is a communication system that permits several terminal units of different operating characteristics to share the same system.

Another object is a communication system that permits terminal units to be connected to a data processing system for burst mode or multiplex mode operation.

A specific object is an *I/O* interface adapted to interlock statements from a signal source with corresponding responses from a signal terminal.

Another specific object is an *I/O* interface which can queue status information supplied by a terminal unit at the end of an operation.

Another specific object is an *I/O* interface which permits various data representations to be transmitted from an *I/O* device to a data processing system and vice versa.

Another specific object is an *I/O* interface which transmits all information over a common bus.

Another specific object is an *I/O* interface having two sets of lines for controlling the transmission of all signals over a common bus.

These and other objects are accomplished in accordance with the present invention, one illustrative embodiment of which comprises a first terminal unit and a plurality of second terminal units. The first terminal unit is responsive to signals supplied by a data processing system or a second terminal. Each second terminal is connected to a plurality of *I/O* devices, and is responsive to signals supplied by the *I/O* devices connected thereto as well as signals initiated by the first terminal unit. A communication link including three sets of lines connects the first terminal unit with each of the second terminal units. The communication system permits a first terminal selection or a second terminal selection to occur for data transfer in either a burst or multiplex mode. Burst mode permits a unit to transmit all information presently available without interruption from other units. Multiplex mode permits a unit to transmit a portion of the information available in a priority relation with other transmitting units.

A first set of lines comprises a bus out and a bus in, each data bus comprising the same number of signal lines. The number of lines in each bus is only limited by the amount of information desired to be transmitted between the first terminal unit and any of the second terminal units.

A second set of lines defined as tag lines, identifies the information on the bus in and bus out. The tag lines out indicate address information, command information or data information on bus out. These lines also perform some "cancelling or nullifying" operations. The tag lines in identify address information, data, or terminal units status in.

A third group of lines, defined as selection controls, control the transfer of information between the first and second terminal units. The selection control lines comprise operational and priority selection lines. The selection controls also include special lines, e.g., suppress out, for altering the effect of the selection and operational lines.

An initial selection sequence begins on receipt of an address from a data processing system. The first terminal transmits the address on the bus out lines and raises the address out tag line. Each second terminal connected to the system attempts to decode the given address. The address must have correct parity to be recognized and only one second terminal should be able to recognize a given address on the system. When the address out line is up and the incoming select out line rises, the selected second terminal unit raises the operational in line. If the data processing system is designed to proceed in a multiplex mode, it will drop the select out line during the initial selection sequence. On the other hand, a second terminal, by holding up the operational in line, can force the data processing system to operate in a burst mode. The multiplex operation will be described first and the burst mode hereinafter.

After the address out line falls, because operational in rises, the *I/O* address is placed on bus in accompanied by a signal on the address in line. The data processing system checks the incoming address against the outgoing address. When correspondence occurs, a command is supplied to the first terminal. The command is placed on bus out and the command out tag line is raised. Address in falls and the address is removed from bus in when command out is detected at the second terminal. The fall of address in allows command out to fall and the command to be removed from bus out. The selected second terminal then replaces the address with status information on bus in and replaces the address in signal with the status in signal. The operational in line remains up throughout this operation. The status information informs the data processing system that the command was accepted or rejected, and describes the present status of the second terminal or *I/O* device. If the channel accepts this status, the service out line is raised. At the receipt of service in at the second terminal, it drops status in and removes status information from bus in When status in drops at the first terminal, it drops service out. This ends the initial selection phase, having established the desired connection between the first terminal and an *I/O* device associated with a second terminal.

When an *I/O* device requires service, it raises the request in line. The select out line is raised by the first terminal but will fall after the address in line rises. The second terminal places the device address on bus in and signals on both the address in line and operational in line. The first terminal recognizes the incoming address and generates a command out signal to the second terminal. The second terminal replaces the device address on bus in with the input data requiring service. Alternatively, when the second terminal requires data, the information on bus in is not significant. The address in line is dropped and the service in line is raised. When the first terminal accepts the input data or provides data to the second terminal, it responds to the second terminal with a service out signal. The second terminal drops the service in line and the operational in line, if the select out is down at the second terminal. The service out signal drops after the service in or operational in drops at the first terminal. If request in is up, the first terminal then raises the select out line in search of another second terminal requiring service. This procedure is repeated for each unit all second terminals have been serviced.

An ending procedure may be initiated by either the second or first terminals. If the procedure is initiated by the *I/O* device, the end of operation is completed in one signal sequence. If the procedure is initiated by the first terminal, the *I/O* device may still require time to reach a point where the proper status information is available in which case a second signal sequence is necessary to complete the ending procedure. One of three situations may exist at the initiation of an ending procedure. In one (1) procedure, the first terminal recognizes the end of an operation before an *I/O* device reaches its ending point. In this situation, whenever the device next requires service, it obtains selection and raises address in line to prepare for the data transfer. The first terminal responds with a command out line which indicates proceed. The second terminal raises the service in line after the command out line falls. The first terminal responds with command out which indicates stop. The second terminal drops the service in line and proceeds to its normal ending point without requesting further service.

When the *I/O* device reaches its normal ending point, the second terminal obtains selection and raises the address in line. The first terminal responds with command out. When command out falls, the second terminal places the status on the bus in and raises the status in line. The first terminal responds with service out unless it is necessary to stack the status. When this occurs, the suppress out and command out lines are raised. Otherwise, this terminates the multiplex operation.

Burst mode operation is substantially the same as described for the data multiplex mode. The difference is if the first terminal is designed to operate burst mode, it will not lower the select out line after the operational in line rises. Select out remaining up keeps the second terminal connected to the first terminal and no further addressing is required for data transmission as long as select out remains up. The selected second terminal will hold up its operational in line as long as select out is up. If the second terminal is designed for burst mode, it will hold up the operational in effecting the same result.

In the other ending procedures, (2) where both the first terminal and I/O device recognize the end simultaneously, and (3) where the device recognizes the end before the first terminal, the first terminal does not need to send out a stop signal. The indication of termination by the second terminal to the first terminal is as described above.

For data transfer by burst mode, no address is necessary for data transmission to or from the first terminal. When a byte of data is ready for transmission to or from the *I/O* device, a service in signal is sent to the first terminal and the data is placed on bus in if this is an input operation. When the first terminal has accepted the input data or has data available for output, the first terminal sends a response on the service out line. This procedure is repeated for each byte of data for as long as the operational in line remains up.

The ending procedure for burst mode is the same as described under the ending procedure for data mutiplex mode, except that no addressing is required to initiate the stop sequence control. If the select out line is down or dropped after receipt of the stop signal, the second terminal can disconnect from the interface by dropping operational in. In this case, the end status is presented to the first terminal as described for data multiplex mode. Otherwise, if the operational in line remains up at the second terminal when the device reaches its ending point, the second terminal presents its status to the first terminal and if the first terminal accepts this status, the latter responds with service out. Operational in drops if select out is down.

A general feature of the invention is a standardized interface connecting a first terminal and a plurality of second terminals, each second terminal connected to a plurality of *I/O* devices.

One feature is a standardized interface comprising bus, tag lines and selection controls, the bus comprising a bus in and a bus out, the information transmitted over the lines being specified by the tag lines and selection of the second terminal involved in the information transfer being controlled by the selection lines.

Another feature is a communication system including a first terminal and a second terminal interconnected by bus, tag lines and control lines, the first terminal generating signals in response to inputs from a data processing system and responses in reply to signals supplied by the second terminal, the transfer of information between the first and second terminals being asynchronous according to the signals generated by the terminal and the responses generated by the receiving terminal.

Another feature is a communication system including a first terminal and at least one second terminal interconnected by a bus in, a bus out, tag lines in, tag lines out, selection controls in and selection controls out, the second terminal being adapted to operate an *I/O* device in a burst or multiplex mode of operation, according to the presence or absence of a signal on a selection control line.

Another feature is a communication system including a first terminal and a plurality of a second terminals which share a bus, tag lines, selection control lines, the first terminal responsive to signals from a data processing system to address any one of "*n*" *I/O* devices connected to the second terminals, where "*n*" is a binary multiple corresponding to the number of data bus lines less parity going in one direction.

Another feature is a communication system including a first terminal and a plurality of second terminals, each second terminal being connected to a plurality of *I/O* devices adapted to generate signals indicating the need for service by a data processing system connected to the first terminal. The transfer of data between the *I/O* device and the data processing system occurring on a statement and response basis whereby each character of data transmitted by the *I/O* device is accepted by the data processing system before the next character is transmitted thereby permitting *I/O* devices and data processing systems of any data rate to be interconnected.

Another feature is a communication system including a first terminal connected between a data processing system and a plurality of second terminals which share data lines, tag lines and selection control lines, each second terminal being connected to a plurality of *I/O* devices which generate status information when completing the transmission of data to the data processing system, the communication system including means to suppress the status information according to the interrupting condition that exists in the data processing system.

Another feature is a standard interface including data lines, tag lines and selection control lines between a first terminal and a plurality of second terminals, each connected to a plurality of *I/O* devices, the selection controls including a request in line which permits a second terminal with the highest priority to receive service from the first terminal in a minimum amount of time after the request in line is conditioned.

Another feature is a standard interface including the data lines, tag lines and selection control lines connected between a first terminal and a plurality of second terminals, each connected to one or more *I/O* devices, the selection control lines including a hold out line which is attached to all second terminals and is used to enable the select out signals whereby when the hold out line is up, the select out line is active and when the hold out line is down, the select out line is inactive.

Another feature is a communication system including a first terminal and a plurality of second terminals interconnected by data lines, tag lines and selection control lines, the selection control lines including suppress out and service out line which in response to a status in control line indicate that the next command signal on the data bus line is to be performed by the same second terminal responding to the data on the data bus.

The foregoing and other objects, features and advantages of the invention will be apparent from the following more particular description of the preferred embodiments of the invention, as illustrated in the acompanying drawings.

Figure 1:
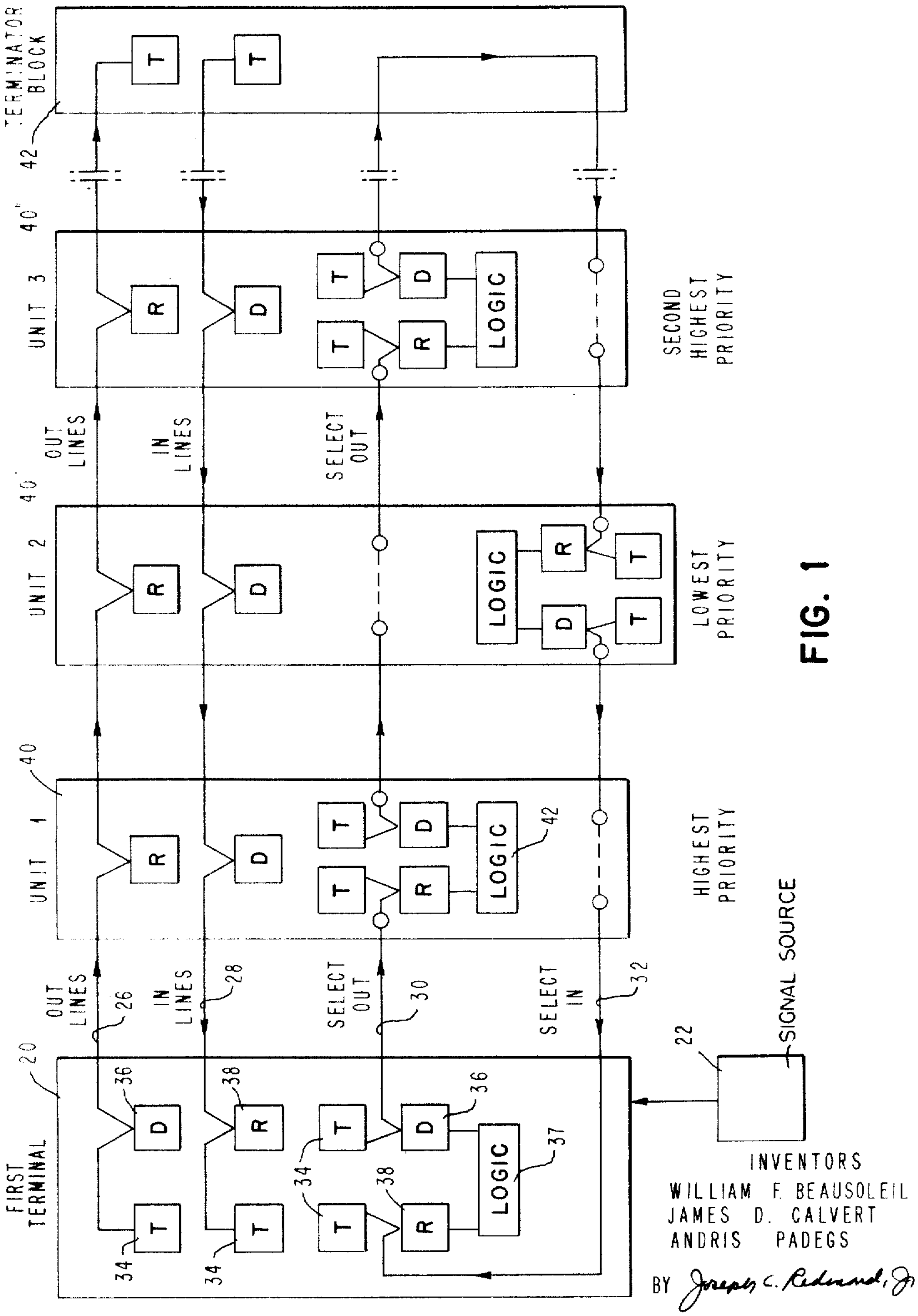
FIG. 1 is an electrical schematic of a communication system of the present invention.

*General.*—Referring to FIG. 1, a first terminal unit 20 connected to a signal source 22 or like includes a plurality of out lines 26 and in lines 28. One signal source found to be acceptable for the present invention is described in a previously filed application, Ser. No. 357,372, filed April 6, 1964, and assigned to the same assignee as that of the present invention. A select outline 30 and a select in line 32 are also connected to the terminal 20. These lines are set out for reasons of emphasis, but are part of the out and in lines. The outlines are connected to terminators 34 and 42, typically characteristic impedance networks. A plurality of drivers 36 and associated logic circuits 37 are individually connected to various out lines, as will appear hereinafter. The in lines also include terminators 34 and 42. Each in line is connected to one or more receivers 38, as will appear hereinafter. In like manner, the select out and select in lines are connected to a terminator 34; driver 36 and terminator 34; receiver 38, respectively.

The out lines 26 are connected in parallel to a plurality of second terminal units 40, 40′ . . . 40$^{n\prime}$ wherein "*n*" is an integer designating the number of prime indications for the last unit connected to the out lines. In like manner, the in lines are also connected in parallel to the second terminal units 40, 40′ and 40$^{n\prime}$ and to the terminator block.

The select out and in lines are sequentially connected to the terminal units 40, 40′ and 40$^{n\prime}$. The select in line is the continuation of the select out line beyond the terminal unit of lowest priority.

Each second terminal unit is a signal source, which controls and responds to one or more other signal sources. One example of a second terminal is described in a previously filed application, Ser. No. 357,370 (IBM Docket 7780) filed April 6, 1964, and assigned to the same assignee as that of the present invention. A typical signal source connected to the second terminal is an *I/O* device for a data processing system, typically a punched card unit, magnetic tape or the like.

Briefly, the communication system, shown in FIG. 1, transmits information in both directions between the first terminal and any one of the second terminals. Information may be data, commands, address or status. Data is information to be processed, stored or transferred by the terminals. Commands are operations to be performed by an *I/O* device connected to a second terminal. Typical commands are read, write, sense, read backward, control and the like. These are not the only commands but are only illustrative thereof. Addresses are unique designations for each *I/O* device connected to the second terminals. The *I/O* devices connected to each second terminal unit are individually selectable by reason of signals supplied by the source 22. The *I/O* devices may individually transmit data to the source 22 by way of the first and second terminal units. Status in information indicates the condition of a second terminal and associated *I/O* device for executing a command or completing the execution of a command.

The terminals are interlocked through the interface lines. One terminal cannot complete an operation until the other terminal acknowledges or responds to the operation.

Having described the system generally, it is now believed in order to discuss in detail the various out and in lines before a detailed description of the system operation.

Figure 2:
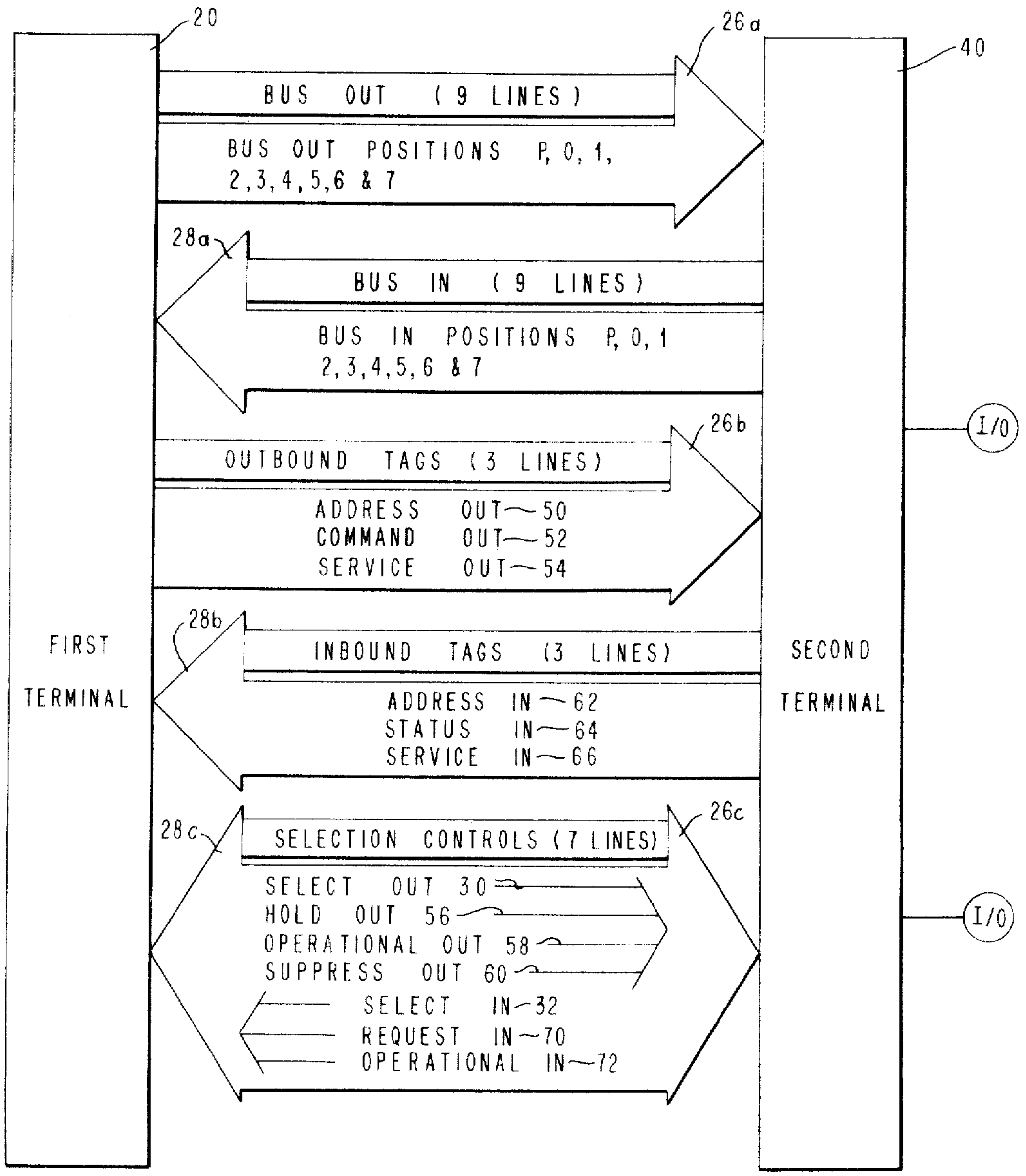
FIG. 2 is a schematic of the various lines included in the electrical schematic of FIG. 1.

*Interface lines.*—Referring to FIG. 2, a first terminal 20 is shown connected to one second terminal 40 for reasons of convenience in explanation. The out lines 26 are divided into three sections. These sections are bus out lines 26A, tag lines out 26B and selection control out lines 26C. The in lines are also divided into three like sections. These sections are bus in lines 28A, tag lines in 28B and selection control in lines 28C. The select out line 30 and select in line 32 (see FIG. 1), are included in the selection controls 26C and 28C, respectively. Generally, the bus out and bus in transfer information between the terminals. The tag lines indicate what information is on the bus out and bus in. The selection control lines interlock the first and second terminals. The interlock requires that information transfer between terminals on a statement and response basis. A terminal instructed to transfer information will signal the interface lines to define a statement of proposed information transfer. The other terminal will decode the signals and provide a response to the statement. When the response is received, information transfer is complete. Each unit of information transfer is handled on this basis. The interlock, thereby, permits terminal units of any data rate to be tied together.

Having described the interface lines generally, it is now believed in order to describe the out lines 26 and thereafter the in lines 28.

*Bus out.*—Bus out lines comprise eight data lines and one parity line which transfers information in the out direction only from the first terminal to the second terminal units. Bus out is employed to transmit address, commands and data to the second terminals. Bus out is not limited to eight lines, but may be any number of lines according to the type of data desired to be transferred. Eight data lines plus a parity line have been arbitrarily selected for convenience in explanation.

Information on bus out is arranged so that bit position 7 of the bus always carries the lowest order bit within an eight bit group or byte. The highest order bit is in position zero and the intervening bits are in descending order from bit position 1 to bit position 6. When a byte, transmitted over the bus out, consists of less than eight bits, the bits must be placed in the highest numbered contiguous bit positions of the bus. Thus, when a data processing system transmits over bus out, only the six bits of a BCD code, bits B, A, 8, 4, 2 and 1 of the BCD code are placed in positions 2 through 7, respectively. When the data processing system places information on or receives information from only four lines of a bus, bit positions 4, 5, 6 and 7 must be used. Any unused lines of bus out must include the low number bit positions of the bus, i.e., bit position 0 and bit positions adjacent to it. The parity bit of any byte must appear in the parity bit position. Unused lines must present a logical zero to the receiving end.

*Tag lines out.*—The type of information that is transmitted over bus out is indicated by the tag lines out 26B. The tag lines out comprise an address out line 50, command out line 52 and service out line 54. The period during which information on bus out is valid is also controlled by the tag lines. During transmission of an *I/O* device address, information on the bus out is valid from the rise of the addres out line 50 until the rise of a particular selection control line 28C, discussed hereinafter. When the first terminal is transmitting any other type of information, the information on the bus is valid from the rise of the signal on the associated outbound tag line until the drop of the signal on the corresponding inbound tag line 28B.

Skew on bus out must be accommodated by the first terminal. The terminal must delay the raising of the signal on the outbound tag line 26B by an amount which insures that the information on bus out will precede the signal on the outbound tag line 26B by not less than 100 nanoseconds.

The first terminal thus provides a delay that accommodates skew caused by its own circuitry and in addition, must provide a delay of at least 100 nanoseconds for eliminating skew caused by the cable. For most second terminal units, this time will also be sufficient to accommodate the skew caused by the receivers. When a second terminal unit can cause more skew, the second terminal must provide the additional delay to eliminate it.

*Address out.*—The address out line 50 connects the first terminal to all attached second terminal units. This line provides two functions. In one function, the address one is used to initiate selection of a second terminal. The address out line signals to a second terminal unit to decode the addres on bus out. The second terminal that recognizes the address must respond by raising a selection control line, as will appear hereinafter. Address out precedes the rise of a signal on the select out line 30 by a preselected delay, typically 250 nanoseconds.

The address of an *I/O* device can be placed on bus out only when select out and another selection control line, i.e., operational in, are down at the first terminal. Ultimate use of the addres on bus out at the second terminal is timed by the next rise of select out at the addressed second terminal. Address out must stay up until either select in or operational in rises. Address out cannot be concurrently up with any other outbound tag line.

As the second function, address out is used to disconnect operations from bus out. The address out line along with the down level of the select out line, signals the second terminal, which is presently connected, to drop its selection control line, thus disconnecting from the system. Address out remains up until operational in drops. Operational in must drop within six microseconds after receiving a disconnect indication.

*Command out.*—The command out line 52 connects the first terminal to all attached second terminals. The command out line is used to signal a selected *I/O* device in response to a signal on particular tag in lines 28B including an address in 62, status in 64 and service in 66. During initial selection of a second terminal, a signal on the command out lines indicates to the selected terminal that the first terminal has placed a command byte on bus out. A command byte on bus out defines a particular operation which will be executed by an *I/O* device connected to the second terminal, and addressed by the first terminal unit. Command out must stay up until the fall of the associated address in, status in or service in signal. It cannot be up concurrently with any other outbound tag line.

At any other time, command out response to address in means proceed. Command out in responding to status in indicates that the second terminal is to hold the information and present it again at another time dependent upon the signal conditions of the select out and suppress out lines. Command out in response to service in indicates that the second terminal should not request further service in this operation.

*Service out.*—The service out line 54 connects the first terminal to all attached second terminal units. This line is used to signal the selected *I/O* device in recognition of a signal on a particular inbound tag line 28B, e.g., service in or status in line. A signal on the service out line indicates to the selected *I/O* device that the first terminal has accepted the information on bus in or has provided on bus out the data, as requested by service in.

When service out is sent in response to service in during information transfer from the second terminal to the first terminal, the service out signal must rise after the first terminal has accepted the information on bus in. In these cases, the rise of service out indicates that the information is no longer required to be valid on bus in and is not associated with any information on bus out. When service out is sent in response to service in during information transfer from the first terminal to the second terminal, the rise of service out indicates that the first terminal has provided the requested information on bus out. In this case, the signal must rise after the information has been placed on the bus. The information on bus out is always of the type that is requested by service in and is used for the purpose of executing the current operation. Service out must stay up until the fall of the associated service in signal. It cannot be up concurrently with any other outbound tag line.

A service out response to status in while a selection control line, i.e., suppress out is up, indicates to the second terminal that another operation will follow immediately after the present operation is completed.

*Selection control lines out.*—The outbound selection control lines 26C include a select out line 30, a hold out line 56, an operational out line 58, a suppress out line 60. These lines determine the priority of transferring information between the terminals. The lines also aid in interlocking the terminals for statement and response operation, and suppress the transfer of information from the second terminal to the first terminal.

*Select out.*—The select out line 30 is the line from the first terminal to the second terminal having highest priority and thereafter to the other second terminals in descending order of priority. A second terminal can raise its operational in line only at the rise of the incoming select out signal. If the second terminal does not need selection, it must immediately propagate the signal to the next second terminal. Once a second terminal has propagated select out, it cannot raise its operational in line until the next rise of the incoming select out line.

When the first terminal is scanning the attached second terminals, the select out line emanating from the first terminal is normally up. The first terminal must keep the select out line up until either select in or address in rises. When select in rises, select out must drop and may not again rise until select in falls. When a second terminal becomes selected, it raises its operational in line. Select out must drop in order that operational in may drop. However, after the drop of select out, the second terminal must keep operational in up until the current signal sequence is complete. For burst mode, the first terminal will hold up the select out line until the end of the operation. A rise of the incoming select out, signals a second terminal that it can become selected to the first terminal by raising its operational in line. If the second terminal raises the operational in line, it must suppress the propagation of select out to its next second terminal. If the second terminal does not desire selection, it must propagate select out to the next second terminal. If the second terminal does not desire selection, it must propagate select out to the next second terminal immediately connected thereafter.

*Operational out.*—The operational out line 58 connects the first terminal to all attached second terminals. This line is used for interlocking purposes. Except for the suppress out line 60, all lines from the first terminal are significant only when operational out is up. Whenever operational out drops, all in lines from the second terminal must drop and the particular operation must be reset.

The down state of both the suppress out 60 and the operational out 58 lines are used to reset all (second terminals) *I/O* devices attached to second terminals. Unless the *I/O* device is in an off line mode, any down state of both of these signals of sufficient duration to cause a response from the device circuitry provides the reset. To insure a proper reset, the operational out and suppress out lines must always be down concurrently for at least six microseconds.

*Suppress out.*—The suppress out line 60 connects the first terminal to all attached second terminals and is used both alone and in conjunction with the out tag lines to provide the following special functions:

(1) *Suppress status.*—When suppress out is up, status information stacked in a second terminal is suppressed and no further attempt is made to present the information to the first terminal as long as suppress out is up. If suppress out rises after a status information cycle has started, the status information cycle signal sequence proceeds normally without regard to suppress out.

(2) *Suppress data transfer.*—For non-cyclic *I/O* devices, e.g., buffered units (which can wait for data transfers without overrun), a data transfer cannot occur if suppress out is up. *I/O* devices which can be overrun are adapted to ignore the suppress out signal on data transfers. Suppress out must rise 100 nanoseconds before the previous service out tag drops in order to insure suppressing subsequent data.

(3) *Chain command control.*—If suppress out is up when a service out responds to terminal status information, command chaining is indicated. Command chaining indicates that the first terminal is immediately going to initiate another operation at the same second terminal. If the suppress out is up for terminal status information, indicating the *I/O* device is available, it indicates chaining only until the suppress out line falls or reselection is made. Suppress out must rise 100 nanoseconds before service out responds.

(4) *Selective reset.*—Whenever suppress out is up when operational out drops, only the *I/O* device in operation on the system resets. For this sequence, suppress out must rise at least 250 nanoseconds before operational out drops and must remain up until at least 250 nanoseconds after operational out rises.

*Hold out.*—The hold out line 56 conditions the second terminals to allow select out to perform its designated function in a second terminal. Only when hold out is up can the select out be considered active. Hold out must gate the select out signal in the second terminals. Hold out can only be up if operational out is up and once hold drops, it must not rise for a least 2.5 microseconds. The hold out and select out lines are ANDed at each second terminal. Throughout the remaining description, operation of the select out signal assumes the proper operation of the hold out signal, i.e., the rise of select out at the second terminal presumes that the hold out signal is up. The fall of select out will be the result of the fall of either select out or hold out.

Having described the out lines, the next several paragraphs will be devoted to describing the in lines. The in lines comprise a bus in 28A, inbound tag lines 28B, and inbound selection controls 28C. Each of these groups will be described in the next several paragraphs.

*Bus in.*—Bus in lines 28A comprise a set of nine lines designated as bit positions 0 through 7 plus parity (P). These lines are used to transmit addresses, status and data to the first terminal. A second terminal can place and maintain information on bus in only when its selection control line, i.e., operational in is up.

*Tag lines in.*—Inbound tag lines 28B indicate the type of information being transmitted over bus in. The inbound tag lines comprise address in 62, status in 64 and service in 66. When address in is up, bus in specifies the address of the currently selected *I/O* device. When status in is up, bus in contains the vital information describing the status of the *I/O* device. When service is up during an execution of an operation, bus in contains information whose nature depends upon the type of operation.

The period during which information on bus in is valid is controlled by the tag lines. Information on the bus must be valid no later than 100 nanoseconds after the rise of the associated inbound tag and must stay valid until the rise of the responding outbound tag. The 100 nanoseconds delay between the time that the signal must be valid on bus in an the rise of the inbound tag places responsibility of deskewing the bus in on the first terminal. The first terminal must provide a delay in the inbound tag line which accommodates skew caused by the first terminal circuitry. In addition, the first terminal must provide a delay of at least 100 nanoseconds for eliminating skew caused by the cable, the drivers and the second terminal logic. For most second terminals, this delay will provide sufficient time to deskew the information so that the inbound tag can be raised by the second terminal concurrently with placing the information on the bus. When a second terminal can cause more skew, the additional delay must be compensated for in the second terminal.

*Address in.*—The address in line 62 is a line from all attached second terminals to the first terminal and is used to signal the first terminal when the address of the currently selected device has been placed on bus in. The first terminal responds to address in by means of the command out tag line.

Address in must stay up until the rise of command out. Address in must fall in order that command out may fall. Address in cannot be up, concurrently with any other inbound tag lines.

*Status in.*—The status in line 64 is a line from all attached second terminals to the first terminal and is used to signal the first terminal when the selected device has placed status information on bus in. The status information has a fixed format and contains bits describing the current statuts at the second terminal. The first terminal responds with either service out or command out, depending upon whether or not it has accepted the status.

The rise of status in indicates that a byte of status information is available on bus in. Status in cannot be up concurrently with any other inbound tag line. Status in must stay up until the rise of an outbound tag. It must fall in order that the responding out tag may fall.

*Service in.*—The service in line 66 extends from all attached second terminals to the first terminal and is used to signal the first terminal when the selected device wants to transmit or receive information. The nature of the information associated with service in depends upon the operation and the device. The first terminal must respond to service in by service out or command out or in the case of a disconnect by address out.

When an *I/O* device performs a read, read backward or sense operation, service in rises when information is available on bus in. During write and control operations performed by an *I/O* device, service in rises when information is required on bus out. Service in cannot be up concurrently with any other inbound tag line. Service in must stay up until the rise of either service out, command out, or address out, whichever comes first; it can only fall after the rise of any of these signals.

When, in the case of cyclic devices, the first terminal does not respond in time to the preceding service in, an overrun condition occurs which the device must recognize. In any case, service in must not drop if an out tag has not risen, or may it rise if a service out has not dropped.

For buffer type devices, when the data rate can be adjusted without an overrun, a further restriction is placed on the service in line. For these devices, the service in line cannot rise unless suppress out is down.

*Selection control lines in.*—The inbound selection controls 28C include a select in line 32, a request in line 70 and an operational in line 72. These lines control the initiation and transfer of data between the second terminal and first terminal.

*Select in.*—The select in line 32 extends from the lowest priority second terminal to the first terminal. It is the outgoing select out line of that second terminal and provides for the select out signal a return path to the first terminal. The definition of a select in line is also the same as that of a select out line emanating from the previous second terminal.

It should be noted that each second terminal provides an option of connecting selection logic in series on either the select out or select in lines. Descending order priority from the first terminal can be established on the select out line. The remaining second terminal units can maintain a descending order priority on the select in line. For purposes of description, the present discussion assumes that the selection logic is connected to both the select out and select in line.

*Operational in.*—The operational in line 72 extends from all attached second terminals to the first terminal and is used to signal to the first terminal that a device has been selected. This line must stay up for the duration of the selected period. The selected device is identified by the address byte transmitted over bus in.

The rise of operational in indicates that a second terminal is selected and is communicating with the first terminal. This communication consists of one or a combination of the following signal sequences:—response to address on bus out, request for data on bus out, offer of data or of status on bus in.

Operational in can rise only when the incoming select out to the second terminal is up and the outgoing select out is down. That is, the second terminal must raise operational in in response to the rise of select out. It must block select out from emanating to the next second terminal. Operational in drops only after select out drops.

Once operational in is up for particular signal sequence, it must stay up until all required information has been transmitted between the first terminal and the second terminal. Operational in must drop at the time or after the outbound tag associated with transfer of the last byte of information rises, if select out is down. For burst mode devices, operational in can drop, if select out is down or drops, after receipt of a stop signal.

Signals on bus in and on the inbound tag lines are significant only if operational in is up. When operational in is down, the first terminal must disregard any signal on these lines. On the other hand, each second terminal must provide interlocks to insure that it does not place any signals on bus in and the incoming tag line unless its operational in line is up.

*Request in.*—The request in line 70 extends from all second terminals to the first terminal and is used to signal the first terminal when any second terminal has data or status to be serviced. Request in can be signaled by more than one control unit at a time.

Request in is signaled from a second terminal only if the terminal is ready to capture the interface and requires service for either input or output. The request in signal is removed by the second terminal after it gains selection of the bus and no current data or service requirements exist for that particular second terminal. If request in is up due to an interruption status, request in can only be up while suppress out is down. Suppress out must degate the request in under these conditions. Request in must fall at the second terminal within 1.5 microseconds after the rise of suppress out.

*Interface operation.*—The following describes typical signal sequences for information transfer. The signal sequences include initial selection of a second terminal and *I/O* device; data transfer and an ending sequence. Two basic modes of operation, i.e., mutiplex mode and burst mode are described. Additional description will be given of suppress operation and chaining. The description will be given in conjunction with FIGS. 3A through 3R, and 4A through 4K. Before beginning these descriptions, a brief explanation of the logic diagrams and flow diagrams included in FIGS. 3A through 3R and FIGS. 4A through 4K will be provided. It should be noted that other signal sequences are possible as natural extensions of the above described signal sequence.

Figure 3A:
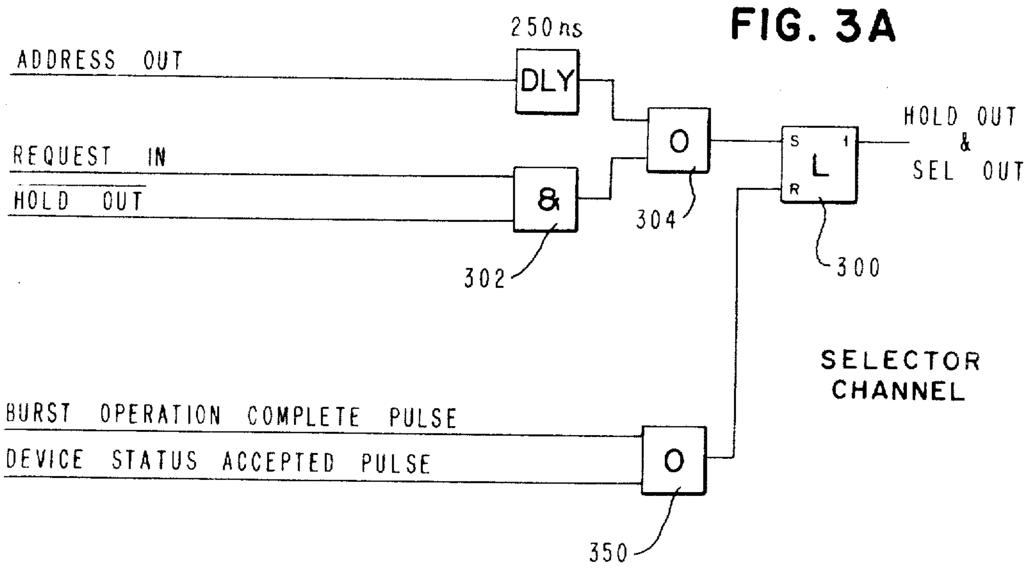
FIGS. 3A through 3R are electrical schematics of logic circuits included in the first terminal and second terminal of the present invention.
Figure 3B:
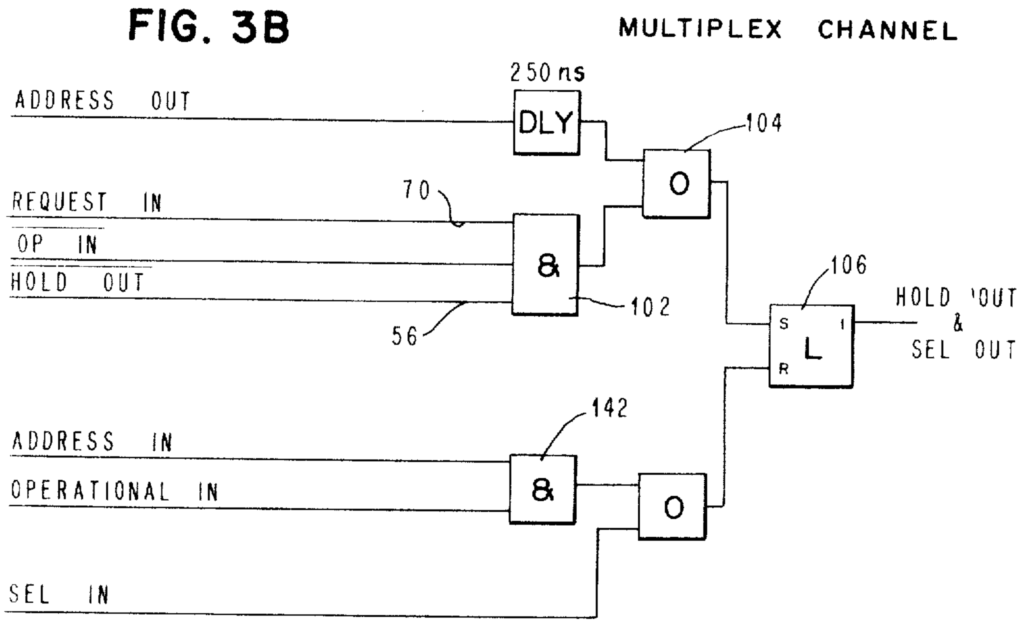
Figure 3C:
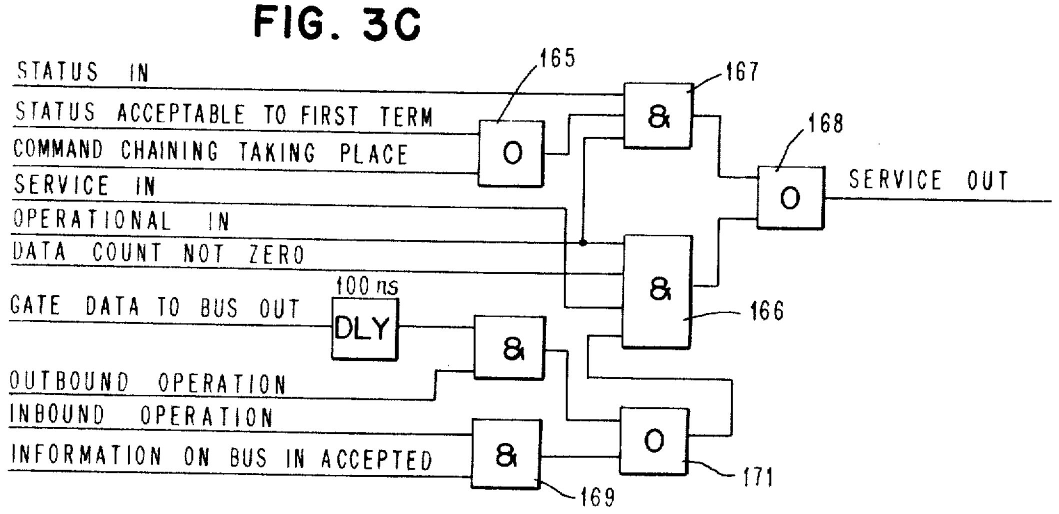
Figure 3D:
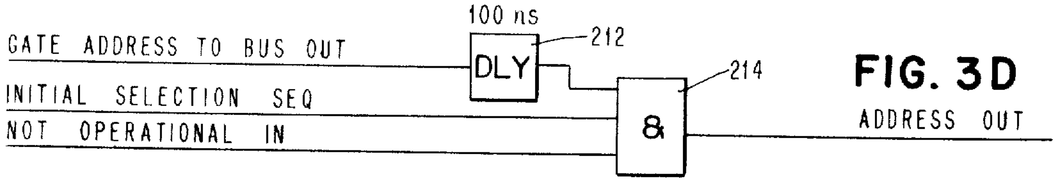
Figure 3E:
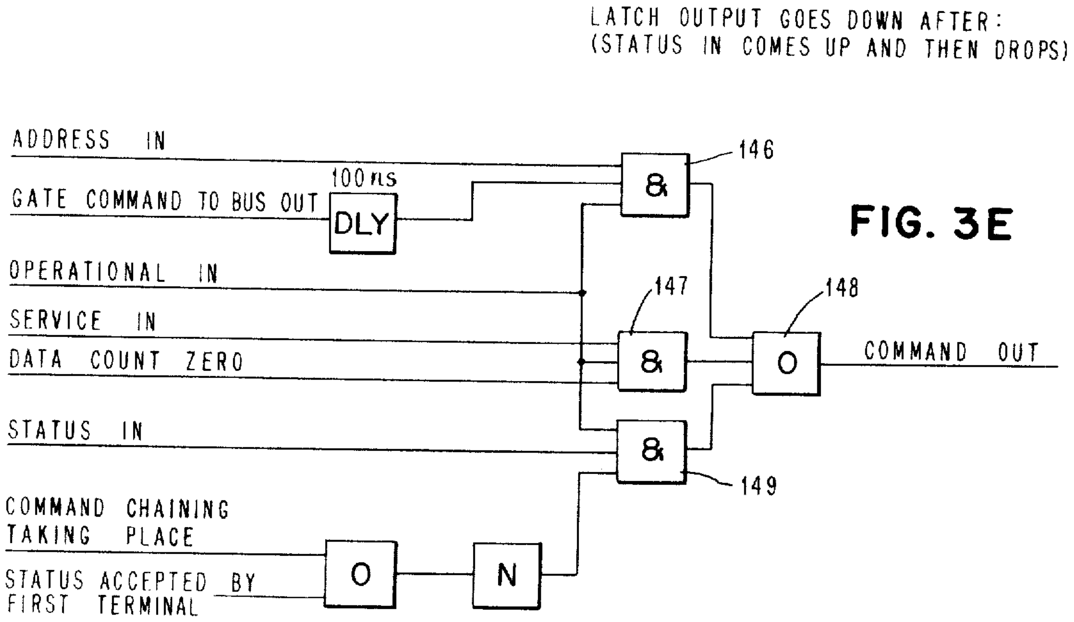
Figure 3G:
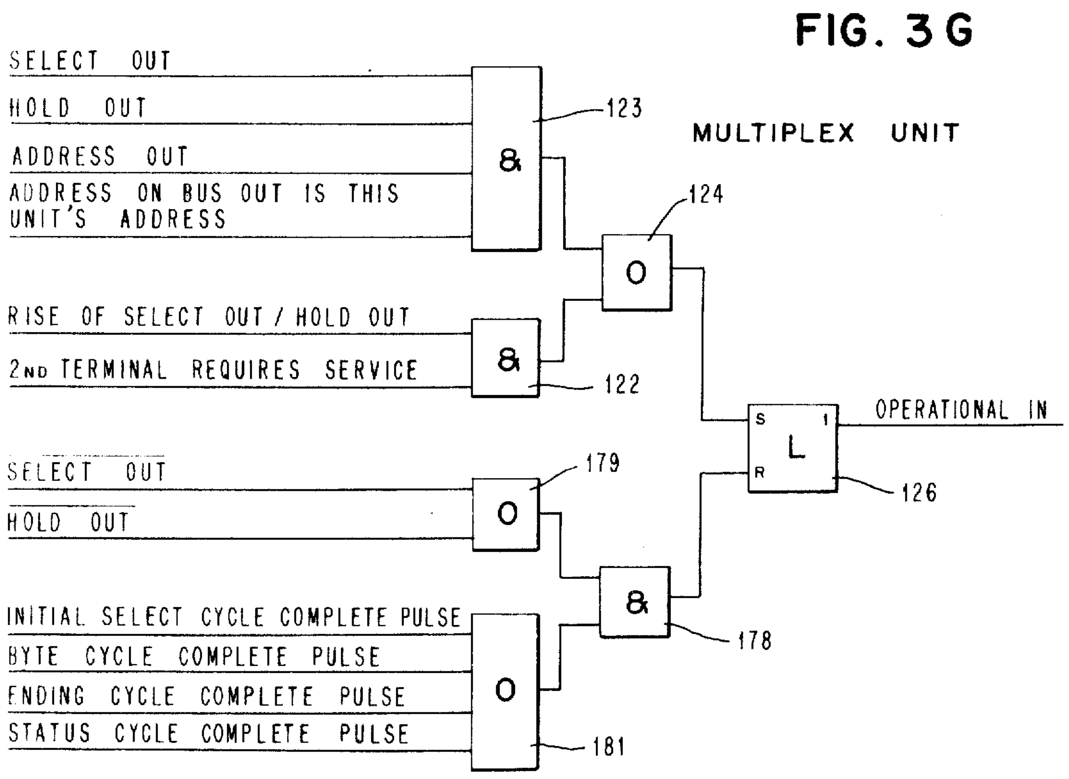
Figure 3R:
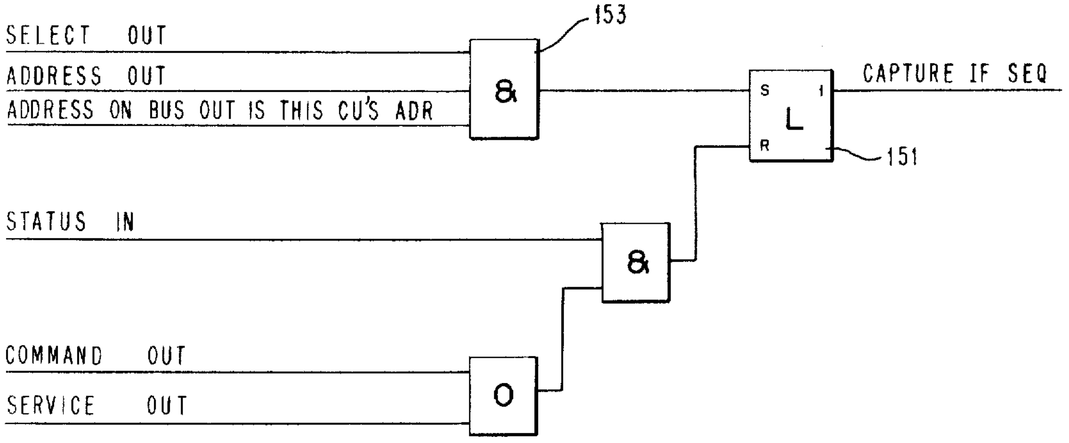

FIGS. 3A through 3R indicate the logic associated with the various bus, tag and selection control lines of FIG. 2. At the right side of each figure, a logic block serves as driver to provide a particular bus, tag or selection control line output. At the left side of each figure, the input signals from the other interface lines and signal sources are applied to logic blocks which serve as receivers.

The logic circuits are ANDs (A), ORs (OR), Latches (L), Double Latch (DL) and Delay (DLY), INVERT (N). All of these circuits, except the Double Latch, are well known in the art, described for example in the text "Handbook of Semiconductor Electronics" edited by L. P. Hunter, McGraw-Hill Book Company, 1956, 1st Edition, Chapter 15. The Double Latch is described in IBM Technical Disclosure Bulletin, December 1961, Vol. 4, #7, page 50. Further description of the logic circuitry, therefore, is not believed necessary. The delay lines, indicated in the logic circuits, are conventional piezoelectric or inductance-capacitance lines or equivalent. Further discussion of the logic circuits will be given in connection with a description of the operation.

FIGS. 4A through 4K are a series of flow diagrams indicating the particular steps in interface operation. The diamond-shaped blocks in these figures represent decision points in the operation of the system. The rectangular blocks represent operations performed by the logic circuits of FIGS. 3A through 3R. It should be noted that the operation of the present system is an interlocking action between the first and second terminals. The sending terminal does not execute the next succeeding operation until or unless the receiving terminal responds with recognizing signal. Thus, the present system is asynchronous and operates without the need for any special timing circuit. The logic circuits of FIGS. 3A through 3R perform the necessary timing in response to the required input signals from the interlocked unit.

*Initial selection sequence* (*multiplex*).—The first terminal selects any particular second terminal by this sequence. The particular terminal to be selected is identified by an eight bit code supplied by the signal source, e.g. a data processing system. This code is transmitted over the bus out, as will be explained hereinafter. The first terminal also supplies the selected terminal with a command indicating the type of operation to be performed by the *I/O* device. In a data transfer system, for example, the commands would be read, write, read backwards, sense and other operations which are described in more particular in the previously filed application, Ser. No. 357,372, filed Apr. 6, 1964, mentioned above. The initial selection sequence, therefore, now to be described, will assume that these signals are provided by the data processing system.

Briefly, the first terminal is supplied the address of an *I/O* device desired to be selected. The first terminal places a binary representation on bus out. The binary representation uniquely defines an *I/O* device. The first terminal raises address out and activates select out; the second terminals attempt to decode the address on bus out. The second terminal that successfully decodes the address raises operational in. If no second terminal decodes the address, select in is propagated which terminates the sequence.

Operational in causes the first terminal to drop address out. The second terminal places an address byte on bus in and raises the address in tag line. The first terminal responds with a command byte on bus out and raises the command out tag line. The second terminal responds to command out by placing status information on bus in and raising the status in line. The first terminal responds with service out, which initiates the data transfer operation between the first terminal and *I/O* device or vice versa according to the command specified.

Initial operation is started with all selection, tag and bus lines being down, except operational out which is up. The gating and other signals associated with the operation of the first or second terminals are described in previously filed applications, Ser. Nos. 357,372, 357,369 and 362,710.

Figure 4A:
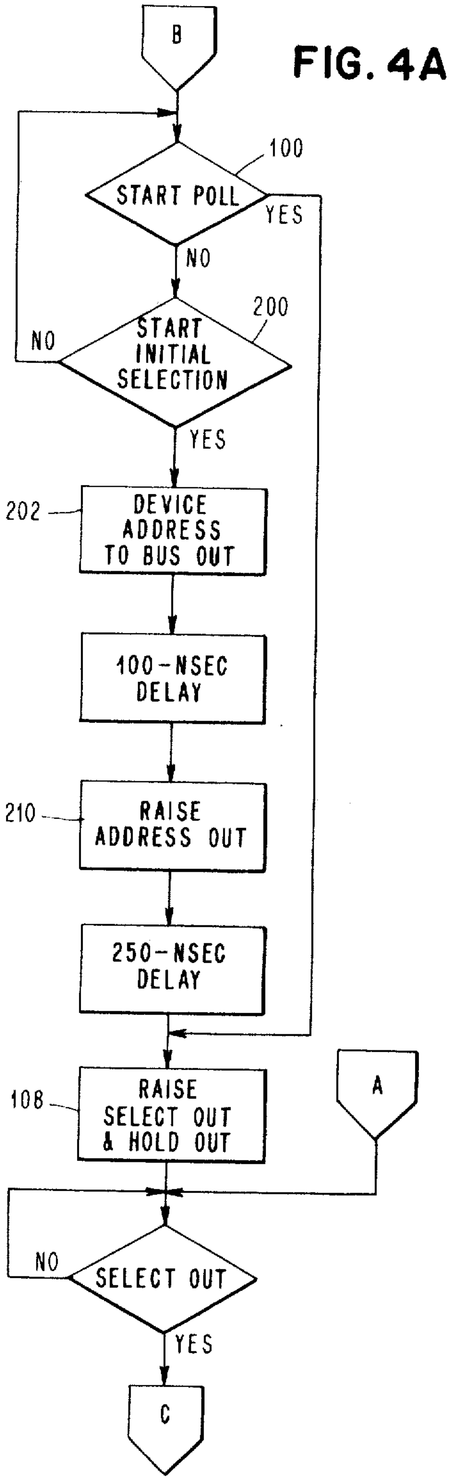
FIGS. 4A through 4K are flow diagrams indicating the operation of the present invention.
Figure 4D:
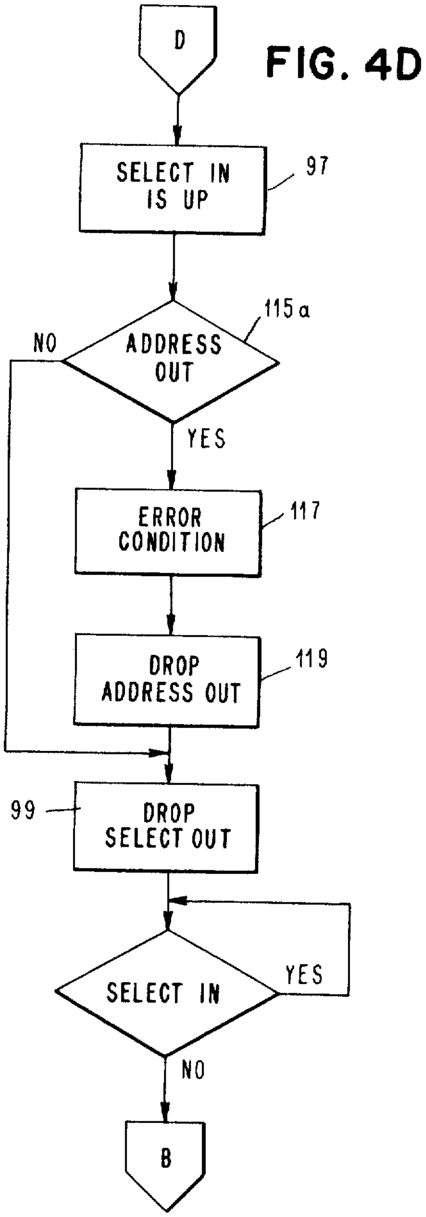

Referring to FIG. 4A, a start initial selection sequence decision 200 is followed by an operation 202 whereby the device address is provided to the bus out. After a 100 nanosecond (ns.) delay, address out is raised as operation 210. This is followed by a raise select out operation 108, approximately 250 ns. after the operation 210 is completed. It is in order to describe the operations 202, 210 and 108 before continuing.

Figure 3I:
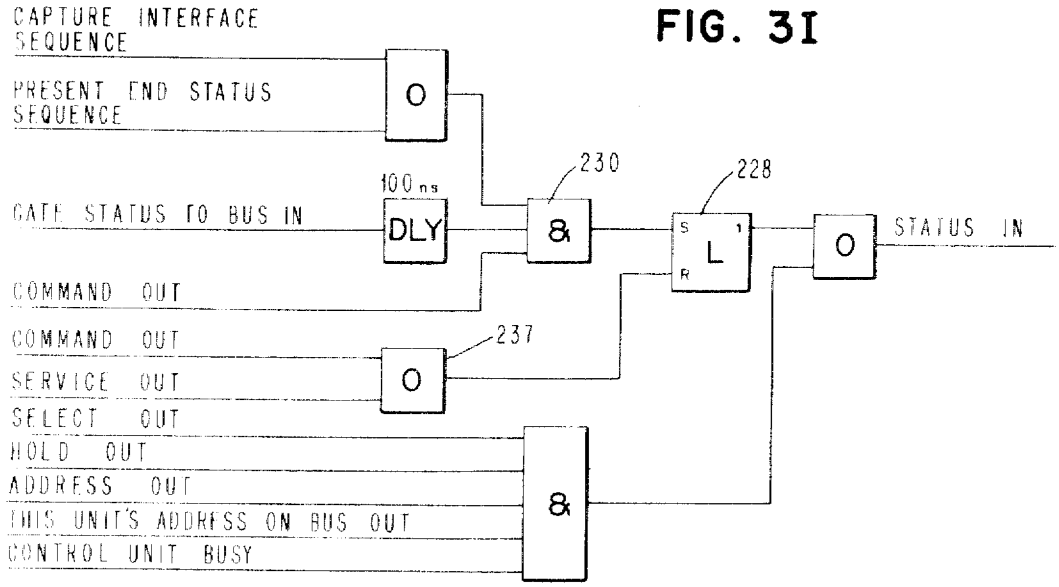
Figure 3J:
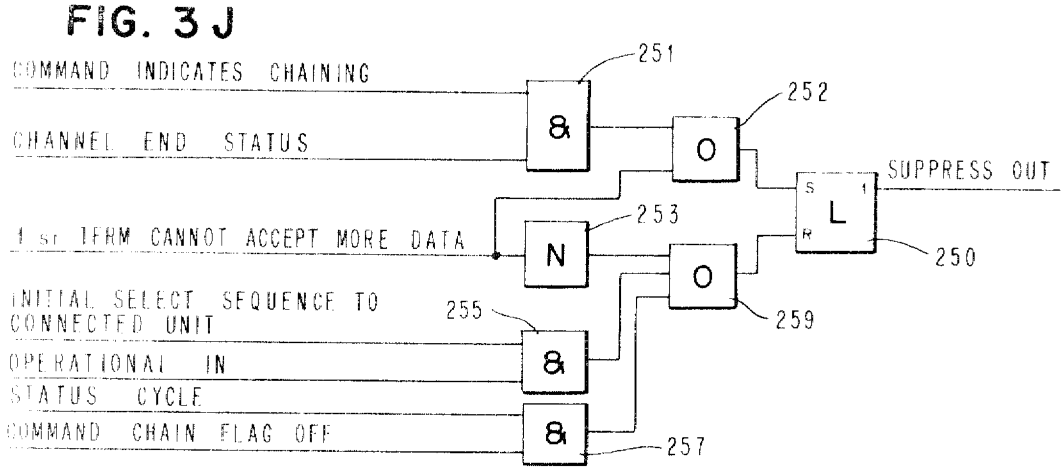
Figure 3K:
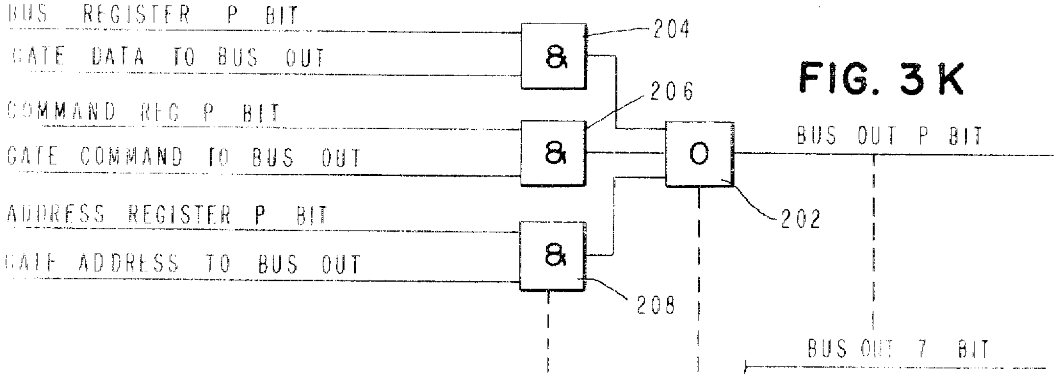

Referring to FIG. 3K, each bus out line is connected to an OR circuit 202 which is activated by any one of three inputs from AND circuits 204, 206 and 208. The address supplied by the data processing system is provided to AND gates 208 associated with the parity line and each bit position line. The first terminal generates a gating pulse to the AND circuit 208 which holds up the address for the bus out line. The gating pulse is generated by the first terminal described in the previously filed application, Ser. No. 357,372.

Referring to FIG. 3D; the circuitry for raising the address out line is indicated. The CPU gating signal is supplied through a 100 nanosecond delay line 212 to an AND circuit 214, as a first input. The initial selection sequence signal provides a second input to the circuit 214. The address out line is raised by the output provided by the gate 214.

The select out line is raised by the logic circuits shown in FIG. 3B. The address out line activates an OR circuit 104 after a delay of 250 nanoseconds. A latch 106 is set by the output from the OR circuit 104. Accordingly, the select/hold out lines are activated by the output from the latch 106.

Figure 4B:
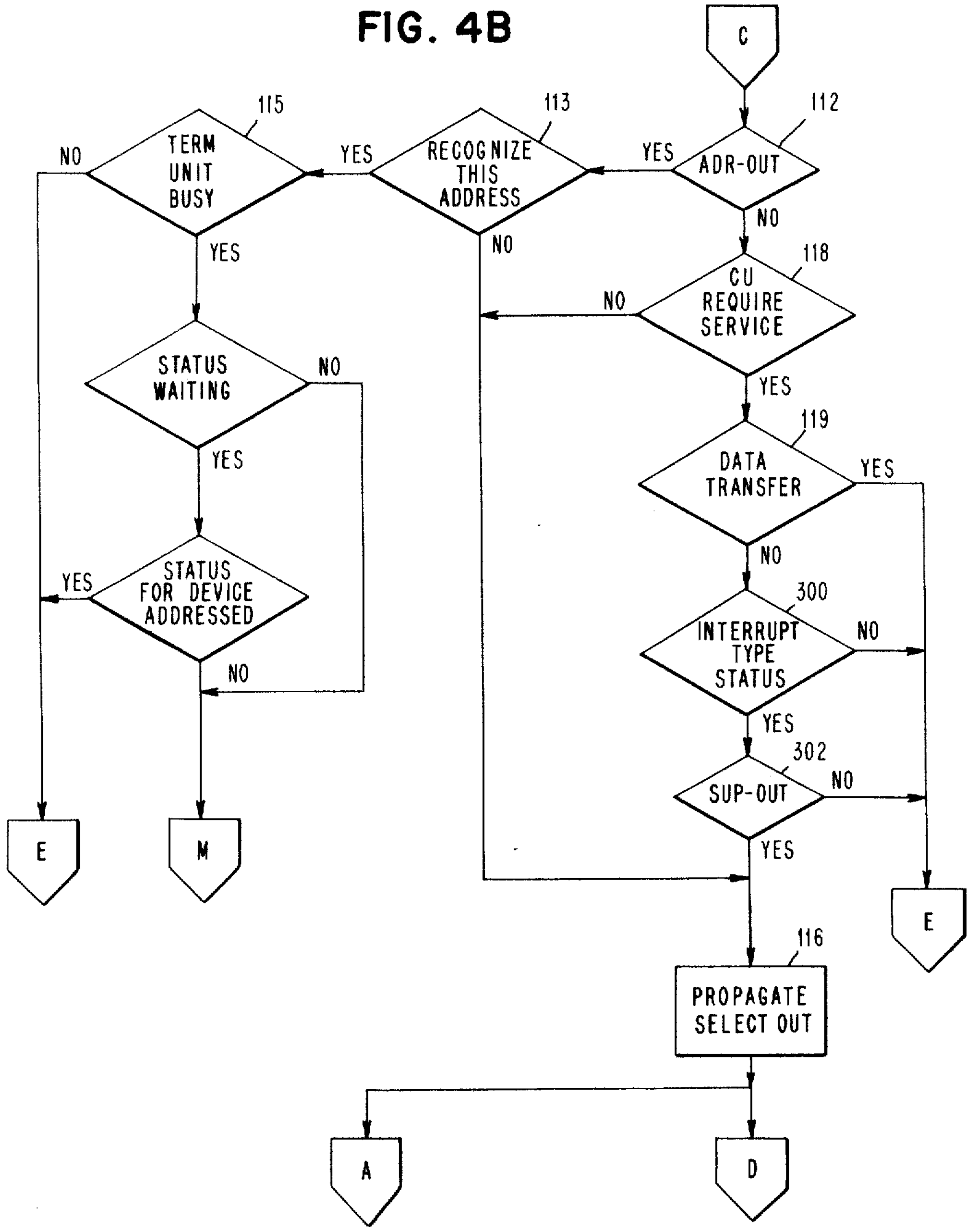

Operation of the initial selection sequence continues on FIG. 4B. The second terminal executes decisions 112 and 113, which are yes since the address out tag line is up and the address for the particular *I/O* device attached to the second terminal is assumed to be recognized. Circuitry for recognizing the address comprises a well-known comparator circuit which will not be described for reasons of brevity. This circuitry is described in the previously mentioned application, Ser. No. 357,370 (IBM Docket 7780). A decision 115 relative to the terminal busy status is assumed to be no for the purpose of this section.

Before continuing, it is in order to discuss the sequence when the decision 113 is no. The terminal proceeds to propagate the select out signal as operation 116. Referring to FIG. 3O, the select out line 30 is up which provides a first input to AND gate 33, AND gate 37 provides a second input, by way of OR gate 30 to the AND gate 33. AND gate 37 is conditioned by the address out signal and the mismatch between terminal and bus address. AND gate 33 sets latch 35 to transmit an outgoing select in signal to the next terminal as its incoming select out signal. The select out pulse is rippled through all second terminals until the lowest priority terminal is reached. The select in signal from the lowest priority second terminal is provided as a select in signal to the first terminal. Detection of this signal in the first terminal is indicated as operation 97 in FIG. 4D. A decision 115*a* in the first terminal, is yes, then the first terminal indicates absence of the addressed second terminal as an error condition (operation 117) to the data processing system. A drop address out operation 119 is executed which is followed by a drop select out operation 99. This completes the unsuccessful selection sequence. Before continuing, the operations 119 and 99, respectively, will be described.

Referring to FIG. 3D, the drop address out operation is completed by the absence of the initial selection sequence signal.

Referring to FIG. 3B, the select in signal resets the latch 106.

Figure 4C:
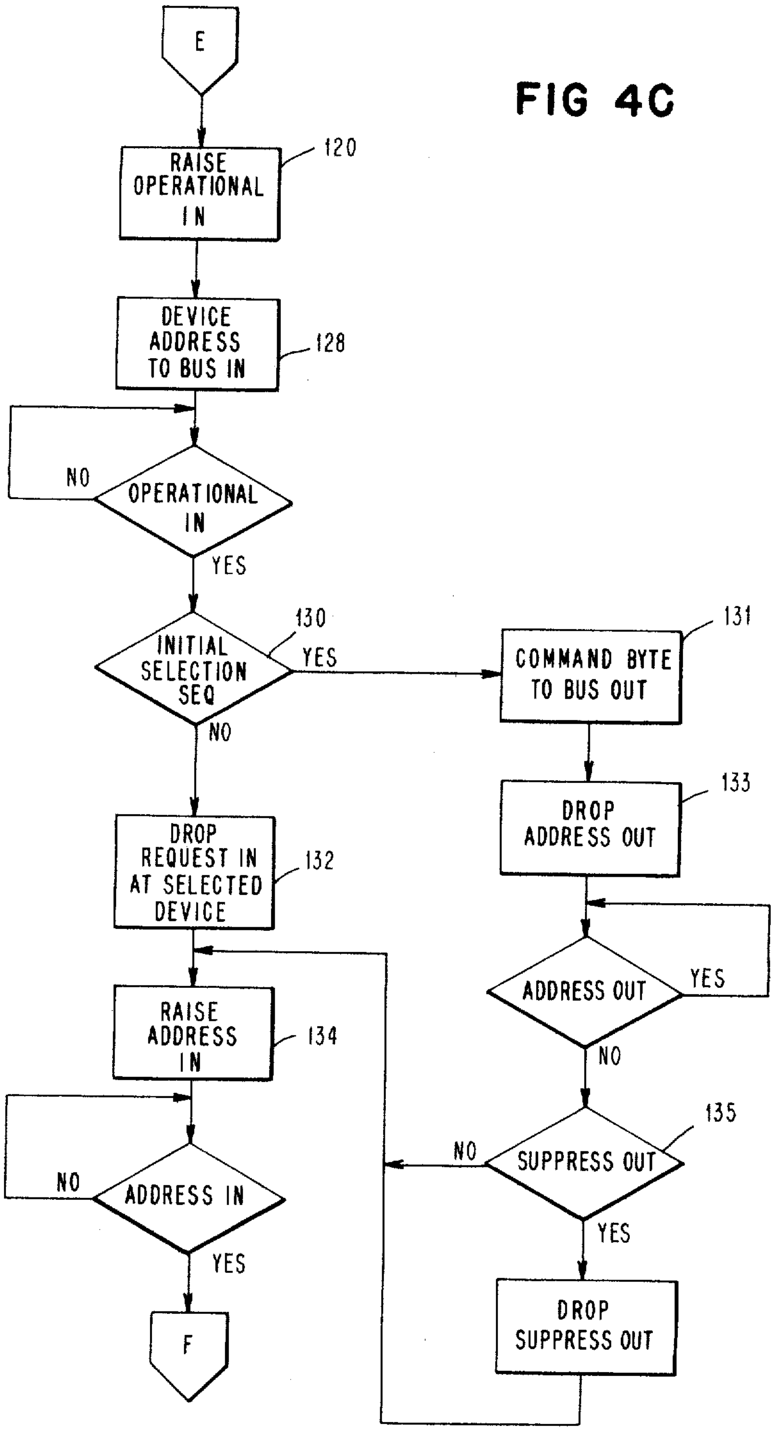

When the address is recognized by a second terminal, the sequence continues on FIG. 4C. The second terminal performs an operation 120 raising the operational in line. This is followed by an operation 128 which places the device address on the bus in. An initial selection decision 130 is yes followed by operations 131 and 133 which place a command on the bus out and drop the address out line, respectively. The second terminal responds with an operation 134 which raises the address in line, after a decision 135 indicates that the suppress out line 60 (see FIG. 2) is not up. Before continuing, these operations will be described.

Referring to FIG. 3C, the operational in line circuitry is indicated. An AND gate 123 receives the select out-hold out; address out; and proper address on bus out signals and provides an output to OR gate 124 which sets the latch 126 to raise the operational in line. These signals were provided in the operations 108, 210 and 202, respectively.

Figure 3M:
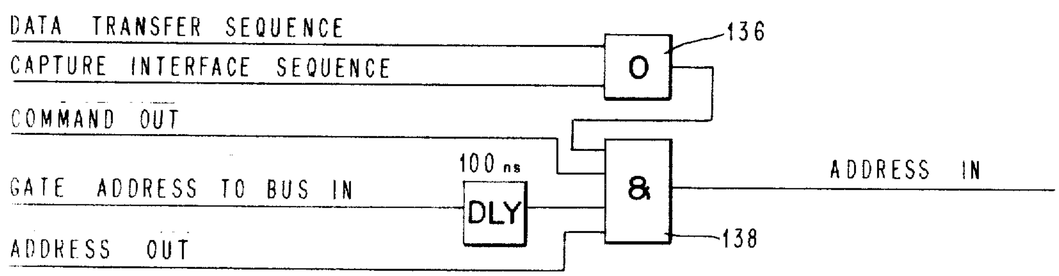
Figure 3N:
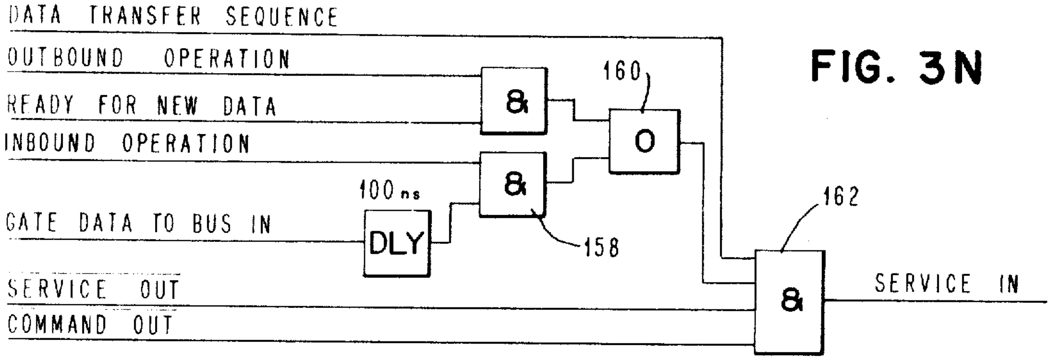
Figure 3O:
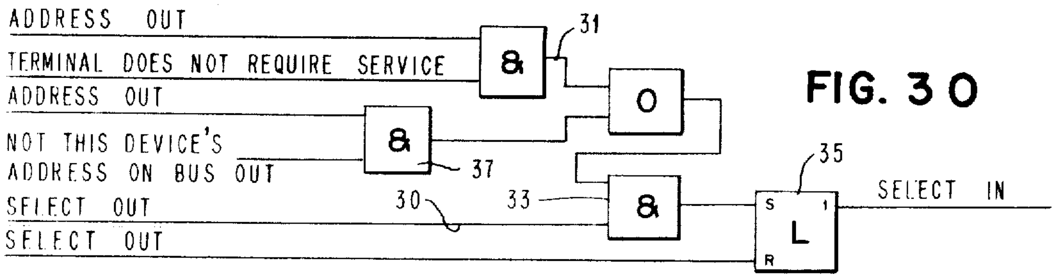
Figure 3P:
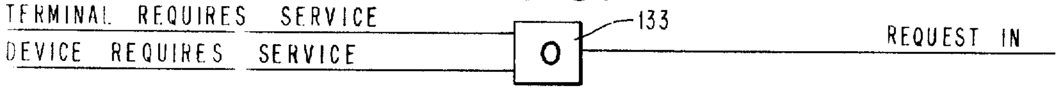
Figure 3Q:
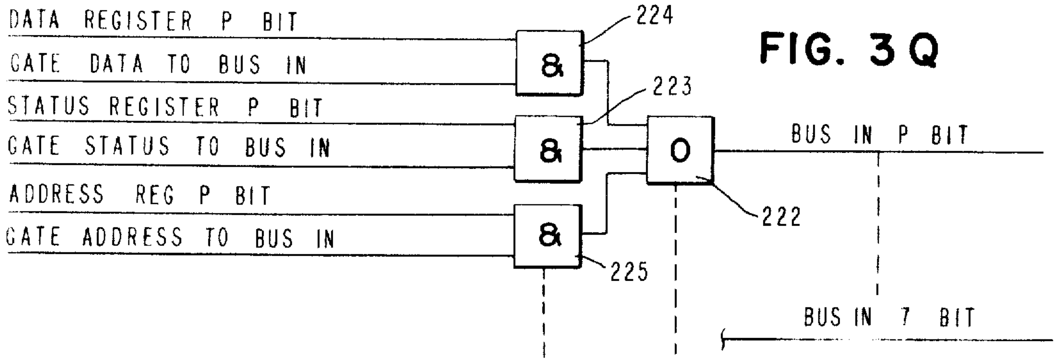

Referring to FIG. 3Q, the device address is placed on the bus in by OR circuit 222, which is activated by any one of three AND circuits 223, 224 and 225. The address is supplied to the AND circuit 225 by the terminal unit described in the previously mentioned application, Ser. No. 357,370 (IBM Docket 7780). The terminal also provides a gating signal which conditions the AND circuit 225. This places the device address on the bus in.

Referring to FIG. 3K, the command is placed on the bus out by AND gates 206 conditioned by the command signal provided by the data processing system. A gate command to bus out signal is activated by a signal from the first terminal. Accordingly, the command is placed on the bus out.

Referring to FIG. 3D, the operation 133 for dropping address out is executed by the indicated logic circuits. The AND gate 214 is deconditioned due to the presence of the operational in line. This line was raised in the operation 120.

The address in line is raised by the circuitry, shown in FIG. 3M. The AND gate 138 of FIG. 3M is activated by the absence of the address out, and command out signals. The address out line was dropped in the operation 133. The command out line has not yet been raised although the command is on the bus out. The command is not valid until the command out line is raised.

Suitable circuitry associated therewith, not shown, provides a signal through the AND gate 138. The address in gating signal was provided for the operation 128 and is still maintained. A capture interface sequence signal is provided to OR gate 136 which provides an output to AND gate 138 to raise the address in tag line.

The capture interface sequence signal is generated by the circuitry shown in FIG. 3R. A latch 151 is set by the output of the AND circuit 153. The AND gate 153 was conditioned when the select out-hold out lines were activated with address out up and the selected address on bus out. Latch 151 is set and remains set until reset. Accordingly, the capture interface sequence signal is present during this interval.

At this stage, the bus out holds the command out code and the select out and operational out control lines have been raised. No outbound tag lines are up. The bus in holds the address in and the address in tag line is up. The operational in control line is also up. At this point, the system proceeds to perform the operation 140, shown in FIG. 4E. This operation drops the select out line, after a decision 139 is yes due to multiplex mode operation. When the select out line drops, the first terminal performs the operation 144 which raises the command out tag line to indicate the presence of the command on the bus out. The second terminal addressed performs the operation 150 which drops the address in line. The first terminal performs the operation 152 which drops the signal on the command out line.

An initial selection sequence decision 153 in the second terminal is yes and the second terminal proceeds to obtain the status of the device selected for service. Before proceeding with the description, the operations 140, 144, 150 and 152 will be described.

Referring to FIG. 3B, the select out-hold out line is dropped by resetting latch 106. An AND gate 142 is conditioned by the presence of the address in and operational in signals. These signals are provided as part of the operations 134 and 120, respectively. An output is provided by the gate 142 which resets the latch 106.

The operation 144 is executed by the logic circuits shown in FIG. 3E. The command out line is activated by an OR gate 148. An AND gate 146 receives the address in, operational in and gate command to bus out signals (delayed) from the operations 131, 120 and 134, respectively. The gate 146, accordingly, provides an output which activates the OR circuit 148 to raise the command out line.

The address in line is dropped by the logic circuits, shown in FIG. 3M. The command out line deconditions an AND gate 138. The command out line was raised in the operation 144. Accordingly, the address in line drops.

The command out line drops, as shown in FIG. 3E, when the address in line drops. The AND gate 146 is deconditioned by the address in line. The AND gates 147 and 149 are also down due to the absence of the service in and status in signals. Accordingly, the output to the OR gate 148 terminates. The command out line, thereupon, drops.

The second terminal now proceeds to provide the first terminal with the status of the selected *I/O* device. The status of the device is generated by apparatus and operation, shown in previously filed application, Ser. No. 357,370 (IBM Docket 7780), mentioned above.

Figure 4E:
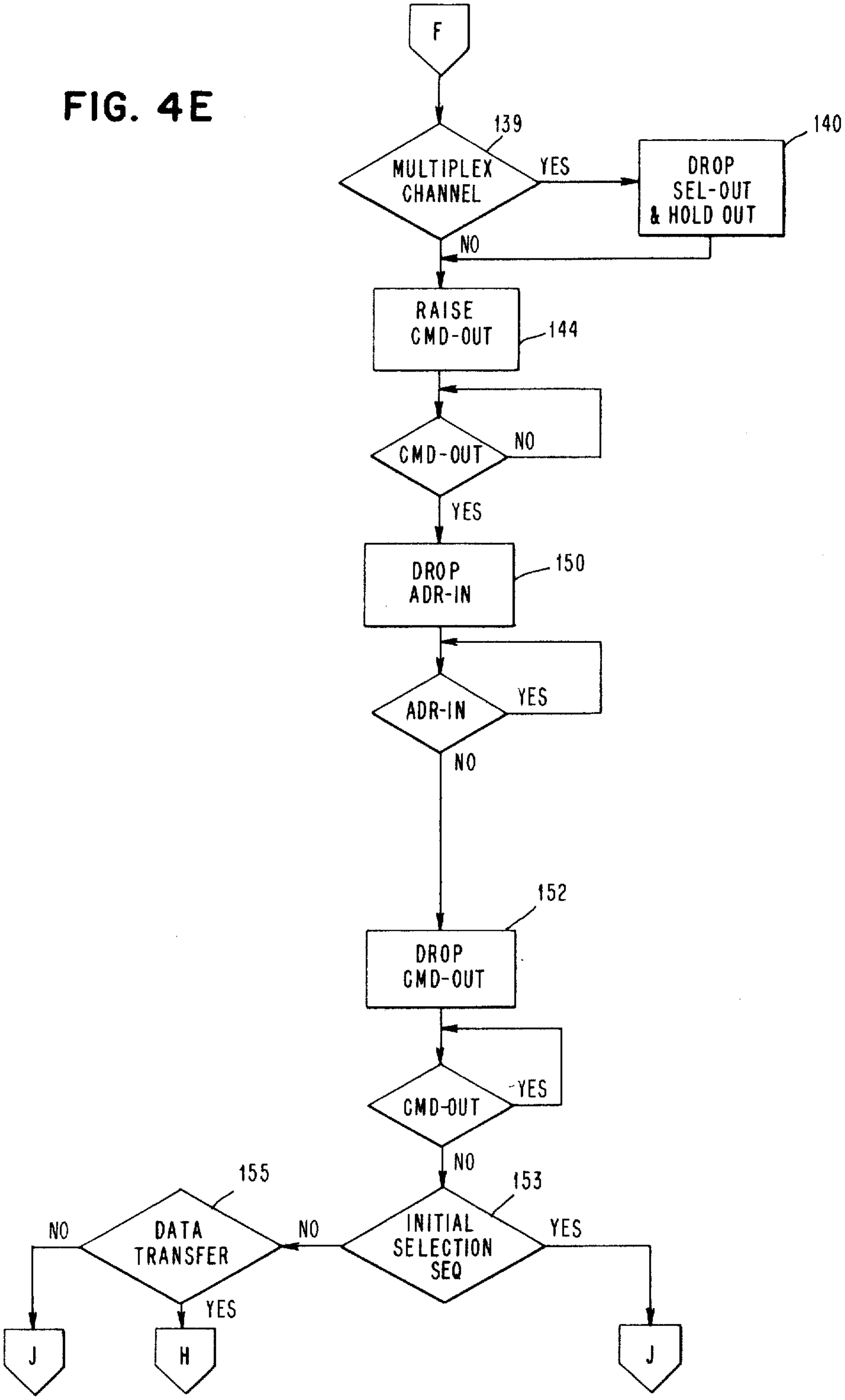
Figure 4K:
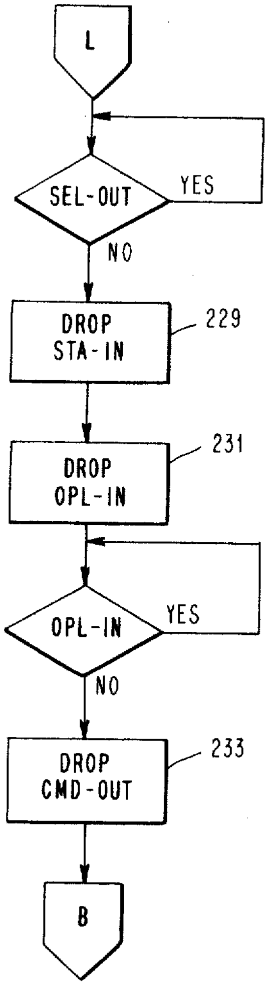
Figure 4F:
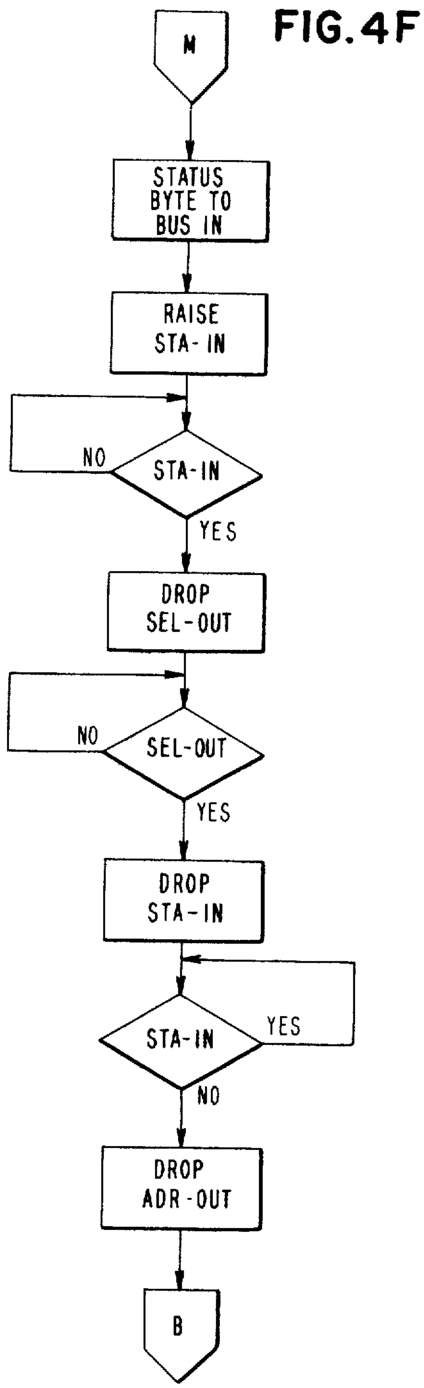
Figure 4G:
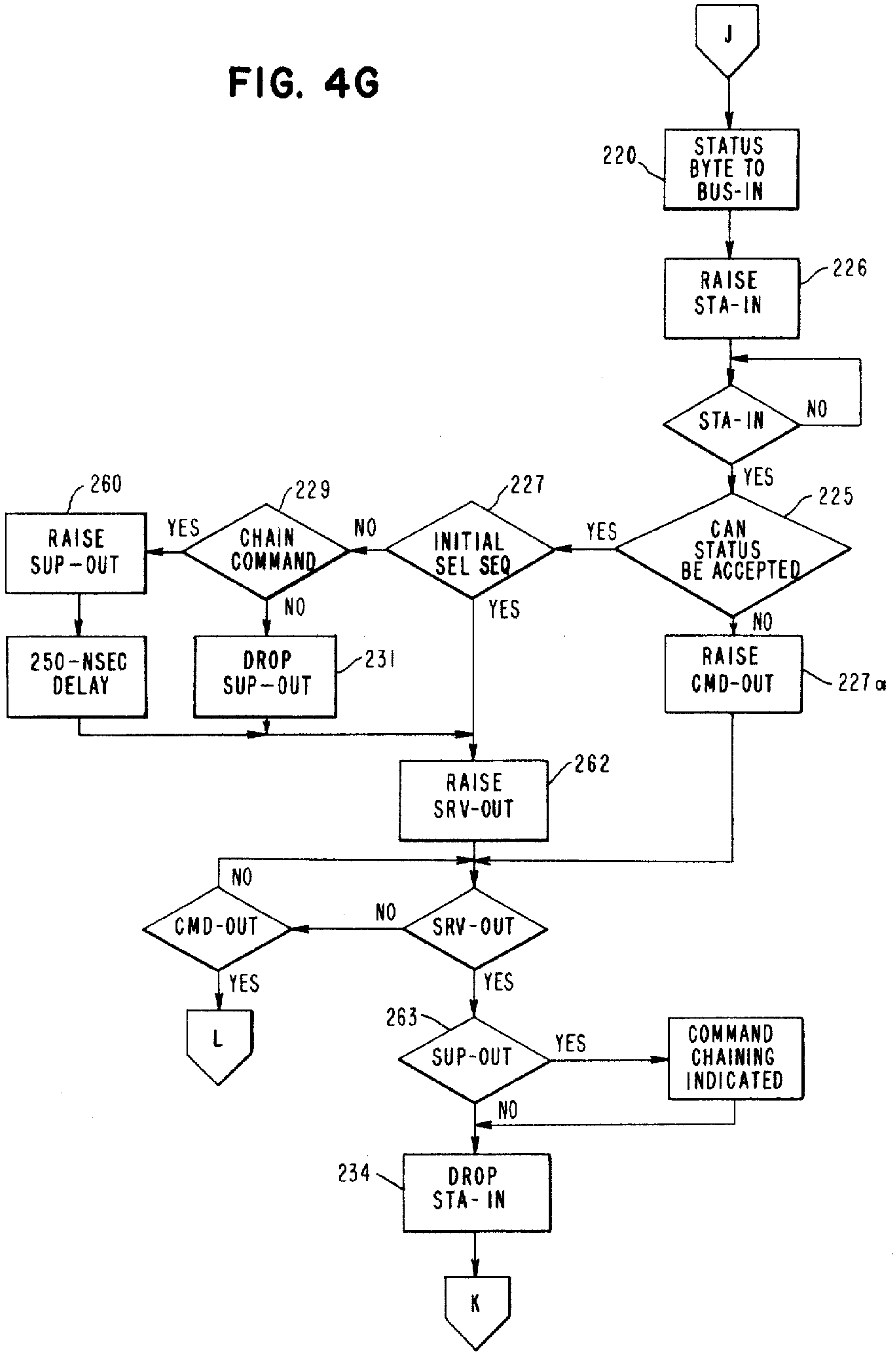

Referring to FIG. 4G, an operation 220 is executed by the second terminal to place the status information on the bus in. Additionally, the second terminal performs an operation 226, which raises the status in line. A decision 225, based upon the acceptance of the status information by the first terminal, controls the next sequence of events. For present purposes, the decision is yes. The no decision will be described later in connection with stacking. Next, a decision 227, which checks whether or not initial selection sequence is being executed. The decision is yes. The no decision will be described hereinafter in connection with chaining.

The first terminal raises the service out line as an operation 262 after the status is accepted. After a decision 263, relative to the status of the suppress out lines, the second terminal performs an operation 234 which drops the status in line. The decision 263 is no since this line has not been raised. Before continuing further, the operations 220, 262 and 234 will be described.

The status is supplied to the bus in by the logic circuits, shown in FIG. 3Q. Each bus in line and the parity in line is connected to an individual OR gate 222. Three AND circuits 223, 224 and 225 are connected to each OR gate. The AND gates 223, 224 and 225 are connected to a status register, data register and address register associated with the *I/O* device as indicated in the previously mentioned application, Ser. No. 357,370. For each of these registers, a gating signal as supplied when ready to transmit their contents. Both the status and gate signals are generated in response to the interface signal sequence as indicated in the application Ser. No. 357,370. When the status and gate signals are present at the AND circuits 223, the register contents are place on the bus in.

The status in line is operated by the logic circuits, shown in FIG. 3I. A latch 228 is activated by an output from AND gate 230. The absence of the command out line, as a result of the operation 152, (see FIG. 4E), is a first input to the gate 230. The second terminal supplies a signal to gate the status to bus in as a result of the previous signal sequence. The status gating signal is a second input to the AND gate 230. A third input is the capture interface sequence signal previously described in connection with the operation 134 (see FIG. 4C). These three signals condition the AND gate 230 which provides an output to set latch 228. The status in is raised by the switching of the latch 228.

Referring to FIG. 3C the service out line is raised by an OR circuit 168 conditioned by the AND gate 167. The status in line provides a signal, as a result of the operation 226, is a first input to the gate 167. A second input is supplied by the signals which condition OR gate 165. This signal is the status acceptable to the first terminal. An output is provided by the gate 165 to the gate 167. A third input to the gate 167 is the operational in signal which was provided by the operation 120. The service out line, thereupon, is activated.

The status in line is reset, as indicated in FIG. 3I, by an OR gate 237 which is conditioned by the service out line, raised in the operation 262. An output is provided by the gate 237 which resets the status in latch 228.

The system now proceeds to terminate the initial selection sequence by dropping the remaining tag and selection control line.

Figure 4H:
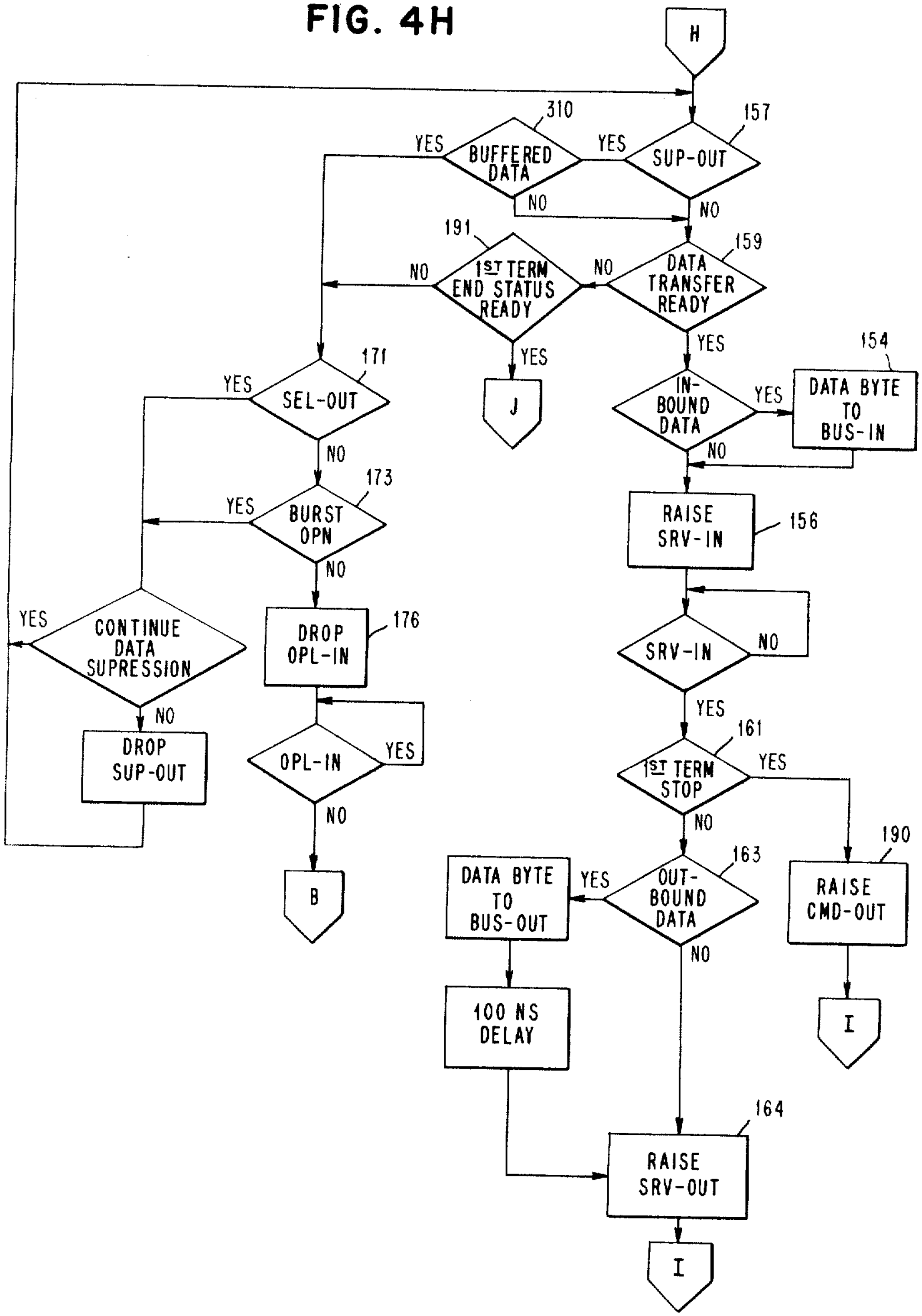
Figure 4I:
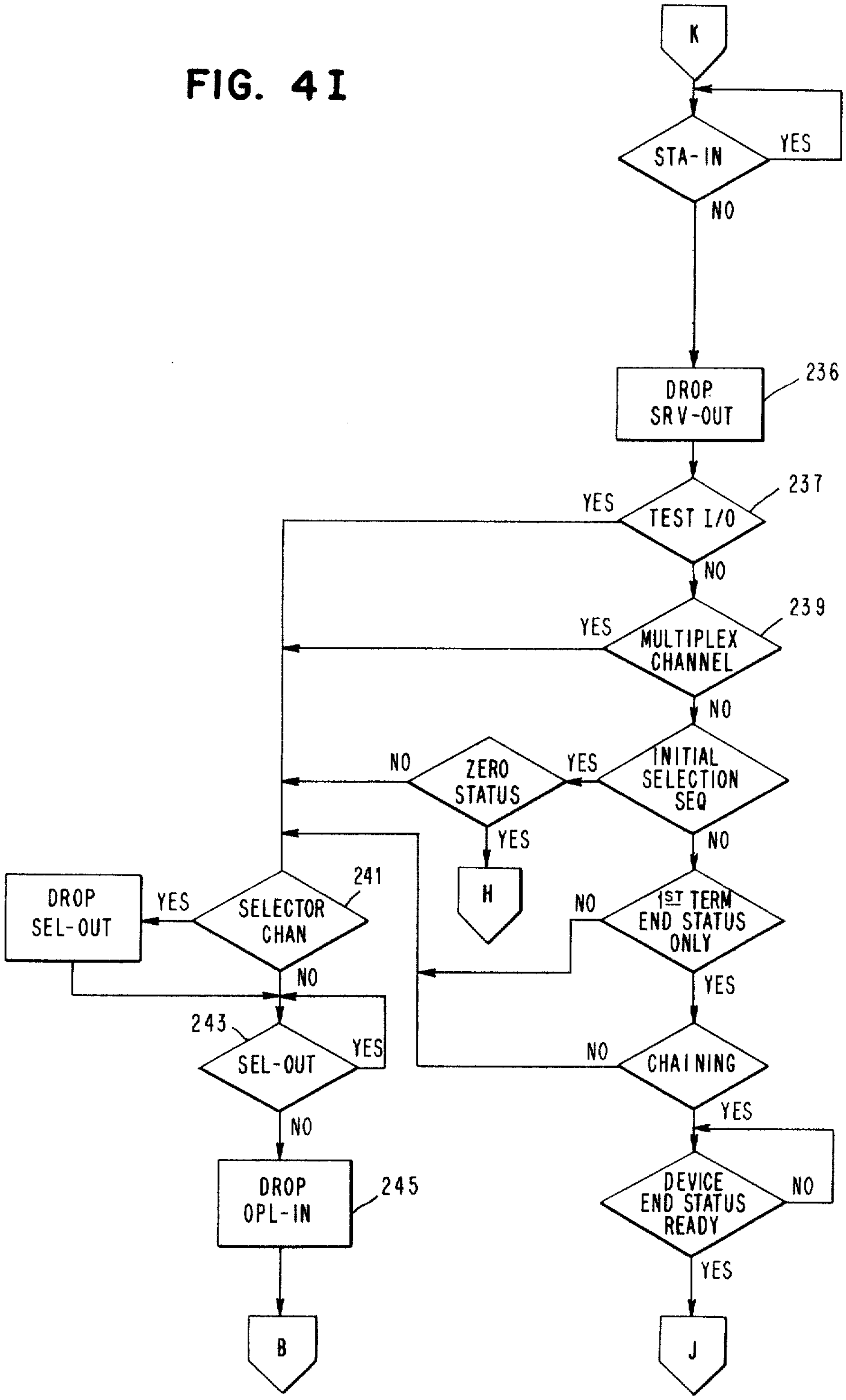

Referring to FIG. 4I, an operation 236 is performed to drop the service out line. Next decisions 237, 239 and 241 are executed. These decisions are relative to the type and mode of operation of the first terminal. A decision 243 is executed relative to the select out line. The line was dropped in the operation 140 (see FIG. 4E). An operation 245 is executed to drop the operational in line. The operations 236 and 245 will be described before continuing.

Referring to FIG. 3C, the AND gate 167 is deconditioned due to the absence of the status in signal which dropped in the operation 234. The AND gate 166 is deconditioned due to the absence of the service in signal which has been down from the beginning of the sequence. Accordingly, the OR gate 168 is deconditioned and service out drops.

Referring to FIG. 3G the AND gate 178 is activated by reason of the select out and hold out signals not being present which permits OR gate 179 to provide a first input to the gate 178. The select out-hold out signals were dropped in the operation 140 (see FIG. 4E). An OR gate 181 is activated by an initial selection cycle complete pulse. The gate 181 provides a second input which conditions the gate 178 to reset latch 126 which drops the operational in line. The initial selection cycle complete pulse is generated in the second terminal unit described in previously mentioned application, Ser. No. 357,370.

The communication system has now selected the second terminal based upon the address supplied by the data processing system and has provided the status of the device. Operation of the system continues on FIG. 4A. The next operation of the system is for the second terminal to perform the command supplied by the first terminal. As the second terminal proceeds in executing the operation, it may require information from or offer information to the first terminal. To accomplish this transfer of information, the second terminal will capture the interface.

*Capture interface sequence (multiplex mode)*.—This sequence occurs when a second terminal is ready to provide data or status information or accept data after having been initially selected and set in operation.

Referring to FIG. 4A a start polling decision 100 is yes and raise select out operation 108 are executed. The start polling operation is executed when the request in line is raised by the second terminal. The request in line is raised when the second terminal wants to transfer information to or from the first terminal. This operation 108 is performed by the logic circuits, shown in FIG. 3B. An AND gate 102 is conditioned to activate OR gate 104 which sets the latch 106. The second terminal raises the request in line to provide a first input to the gate 102. The hold out line and operational in lines are down and provide second and third inputs to AND gate 102. In the absence of the request in signal, the first terminal does not perform any polling operation of the sequence continues on FIG. 4B.

Referring to FIG. 4B, each second terminal determines whether or not the address out line is raised as decision 112. The decision 112 is no. The second terminal next determines whether it needs service by the signals supplied by the attached *I/O* devices. If the second terminal requires service, indicated by decision 118, a data transfer decision 119 is executed. If data is available for transfer, an operation 120, indicated in FIG. 4C, raises the operational in line.

Turning to FIG. 4C, the operation 120, which raises the operational in line, is followed by an operation 128 which places the device address on the bus in. The logic circuit for these operations are shown in FIGS. 3G and 3Q, respectively. These figures will be discussed in succession.

Turning to FIG. 3G, an AND circuit 122 receives the select out-hold out signal and also a signal from the *I/O* device indicating a need for service. The AND circuit supplies the signal to OR circuit 124 which sets the latch circuit 126 to raise the operational in line.

The logic circuits, shown in FIG. 3Q, have been previously described in connection with the operation 128 of the initial selection sequence.

Returning to FIG. 4C, the request in line is dropped as operation 132, since we are not in an initial selection, as indicated by the decision point 130. The address in line is raised by the second terminal as operation 134. The operations 132 and 134 will be discussed successively in conjunction with FIGS. 3P and 3M, respectively.

The request in line, as indicated in FIG. 3P, is dropped when an OR circuit 133 is deconditioned by the absence of a signal indicating the second terminal requires service. With request in line down, the second terminal raises the address in line, by the circuits shown in FIG. 3M. An OR circuit 136 receives a data transfer sequence signal, generated by the second terminal, and provides an output to the AND circuit 138. The circuit 138 is also receiving the not-command-out signal and the not-address-out signal. These signals are up due to the absence of the signals on the corresponding interface lines. Additionally, a gate address in signal, delayed by 100 nanoseconds, is supplied to the AND circuit 138. The AND circuit 138 raises the address in line.

Referring to FIG. 4E the select out and hold out lines are dropped as the operation 140 since the decision 139 is yes. The operation 140 is followed by an operation 144 which raises the command out tag line. The second terminal responds with an operation 150 which drops the address in tag line. When address in drops, the first terminal performs an operation 152 which drops the command out line. The second terminal next performs a data transfer sequence decision 155 since an initial selection sequence decision 153 is no. The decision 155 is yes. Before continuing further, it is believed in order to discuss successively the circuits for the operations 140, 144, 150 and 152.

Referring to FIG. 3B, an AND circuit 142 receives the address in line and operational in line which are presently raised and provides a signal to latch 106 which resets the hold out and select out lines.

Referring to FIG. 3E, the command out line is raised by the presence of the address in signal, operational in signals and gate command to bus out signal (delayed 100 nanoseconds). These signals are combined at AND circuit 146 to provide a signal to OR circuit 148 which initiates the command out line.

Referring to FIG. 3M, when the command out line rises, the AND circuit 138 is deactivated and the address in line falls.

Returning to FIG. 3E when the address in line is dropped, the AND circuit 146 is deactivated resulting in the OR circuit 148 dropping the command out line. Since this is a data transfer operation, the remaining operations are described in FIG. 4H.

Turning to FIG. 4H, a suppress out decision 157 is no since the suppress out line is down. Data is available for transfer from the device to the first terminal. A data transfer ready decision 159 is yes. Since this is an inbound data operation, data is placed on the bus in in an operation 154. This operation is accompanied by an operation 156 which raises the service in line. The first terminal responds with an operation 164, raising the service out line, after a stop decision 161 and outbound data decision 163 indicate no. Before continuing, it is in order to describe the logic circuits for the operations 154, 156 and 164.

Referring to FIG. 3Q, the AND gate 224 is gated by a gate data to bus in and data signal generated by the second terminal. This operation is similar to that described for the status and address information previously described.

Turning to FIG. 3N, an inbound signal is supplied to AND circuit 158, the inbound signal being available in the second terminal as a result of the command supplied by the first terminal. The AND circuit 158 also receives the gate data to bus in signal delayed by 100 nanoseconds. An output is provided from AND circuit 158 to OR circuit 160 which activates AND circuit 162. The AND circuit 162 is already receiving a data transfer sequence signal and the not-service-out and not-command-out signals. Accordingly, the service in line is raised.

Referring to FIG. 3C, an inbound operation signal and information on bus is accepted, condition an AND gate 169 which provides a first input to the AND gate 166 by way of the OR circuit 171. A service in signal together with a data count of not zero and operational in signal provides second, third and fourth inputs, respectively, to the AND circuit 166. AND circuit 166 provides an output to OR circuit 168 which raises the service out line.

Figure 4J:
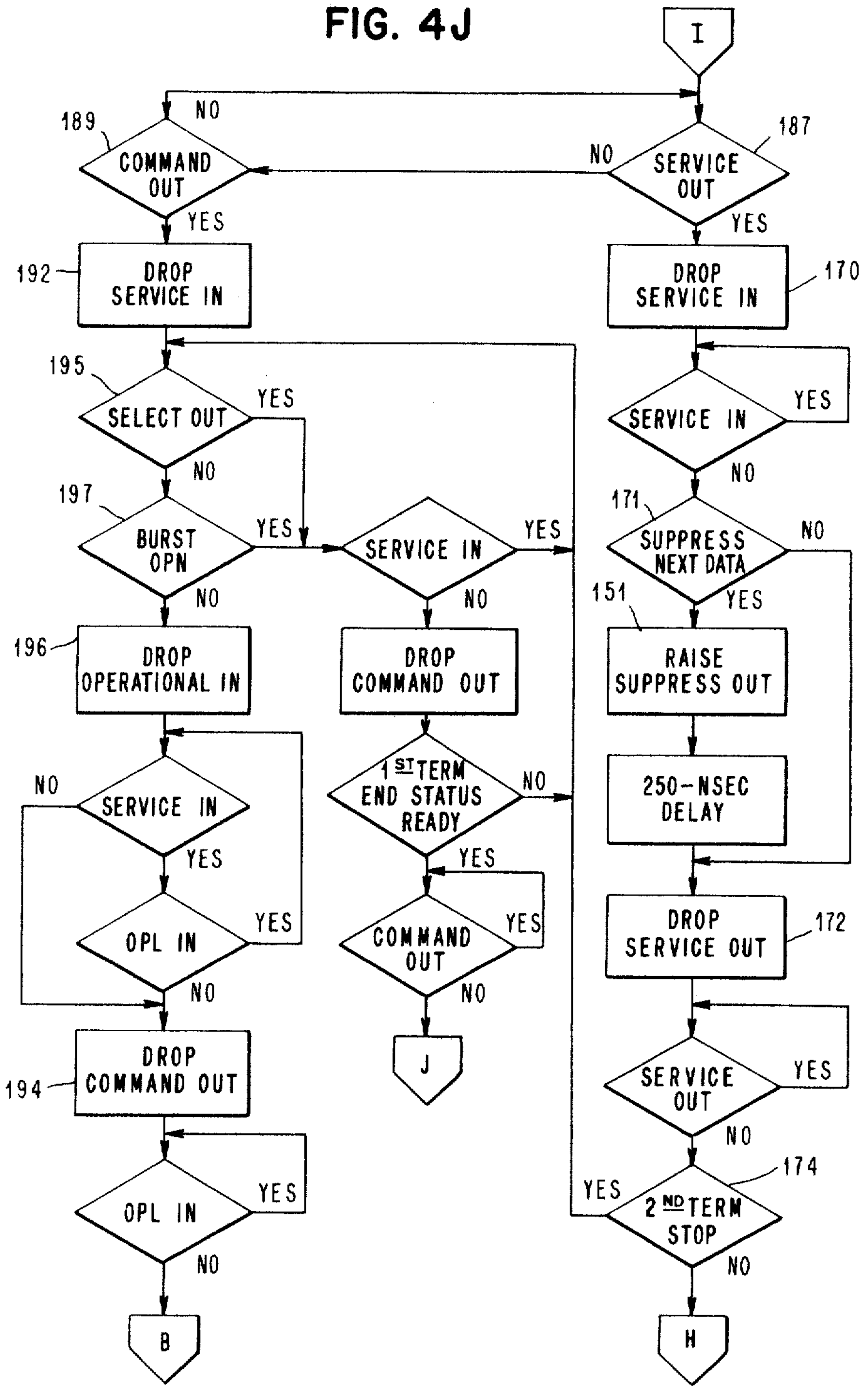

Continuing, operation is indicated on FIG. 4J. When the service out line is raised, the second terminal drops the service in line as operation 170. This operation is followed by an operation 172 which drops the service out line, provided a suppress next data decision 171 is no, since the suppress out line has not been raised. At this time, an inspection is made by the second terminal for subsequent operation. Before further description, it is believed in order to describe the logic circuits for the operations 170 and 172.

Referring to FIG. 3N, the service out line comes up which deconditions the AND gate 162. The service in line, as a result, drops.

Referring to FIG. 3C, with the service in line down, the AND gate 166 is deactivated which causes the OR circuit 168 to drop the service out line.

Turning now to FIG. 4H, the suppress out decision 157 continues to be no. The data transfer ready decision 159, however, may be no, assuming a slow speed *I/O* device connected to the terminal. Accordingly, an operation 176 is executed. This operation drops the operational in line, provided a first terminal end status ready decision 191, select out decision 171 and burst mode operation decision 173 are no. In the present situation, this is the case.

Turning to FIG. 3G, at this particular time, a byte cycle complete pulse activates the OR circuit 181 which provides a first input to the gate 178. The select out and hold out signals are not present which condition AND gate 178 by way of the OR gate 179, to reset the latch 126 and drop the operational in line. All lines, except operational out, are now down between the first and second terminals with the result that the system returns to the start polling operation 100, shown in FIG. 4A.

*Ending sequence.*—The communication system can terminate an operation in three different situations. The first situation is where the first terminal recognizes the end of the data transmission before the *I/O* device attached to the second terminal reaches its ending point. This determination is provided by the first terminal, which supplies the signal when the amount of the data received equals the amount of data requested. The second situation is where the *I/O* device attached to the second terminal recognizes the end of the operation before the first terminal reaches the end. The third situation is where the first and second terminals recognize the end of the operation simultaneously.

In the first situation, the first terminal responds with the command out line after the second terminal has requested service and raised its service in line to request the data transfer.

Referring to FIG. 4H, the second terminal is assumed to have performed the operation 156 which raises the service in line. A decision 161 relative to the first terminal stop is yes, which is followed by an operation 190 raising the command out line. The second terminal tests for service out and command out decision 189 (see FIG. 4J), which is followed by operation 192 dropping the service in line. The decision 187 is no and the decision 189 is yes. The first terminal responds to the operation 192 with an operation 194 which drops the command out line. The *I/O* device, thereupon, proceeds to its normal ending point without requesting service until all operation is completed. With the select out line down and the interface in a multiplex mode, the second terminal executes decisions 195 and 197 which are no. Thereafter. the interface proceeds to drop the remaining tag line. Accordingly, an operation 196 is executed to drop the operational in line. This operation is performed contemporaneously with or slightly before the operations 192 and 194. The interface returns to the start polling decision 100, shown in FIG. 4A. Before further description, it is in order to describe the operations 192, 194 and 196.

Referring to FIG. 3N, the service in line is dropped by the AND gate 162 being deconditioned by the presence of the command out signal. This signal was set in the previous operation 190 (see FIG. 4H).

The command out line is dropped by the OR gate 148, shown in FIG. 3E, being deconditioned. The AND gates 146, 147 and 149 connected thereto are deconditioned by the absence of address in, status in and service in signals. The absence of an output from the gates 146, 147 and 149 deconditions the OR gate 148 which drops the command out line.

With regard to the operational in line, shown in FIG. 3G, an AND circuit 178 receives a first input by the absence of the select out and hold out signals. These signals were dropped as the operation 140 described in FIG. 4E. The signal is supplied by an OR circuit 179 which is conditioned by the absence of the select out-hold out signal. A second input to the AND circuit 178 is supplied by an OR gate 181 from the ending cycle complete pulse. This pulse is generated by the second terminal upon the receipt of the stop signal. An output is provided by the gate 178 to reset the latch 126 which drops the operational in line.

The first terminal thereafter returns to the start polling operation 100, described in FIG. 4A. The *I/O* device proceeds to a normal ending point and generates the status information necessary to advise the first terminal of the conditions under which operation terminated. This status may be used for interruption of the data processing decision. Returning to FIG. 4B, the outstanding status causes the decision to be yes. The data transfer decision 118 is no. An interruption type status decision 300 is yes. A suppress out decision 302 is no. Operation continues on FIG. 4C.

Turning to FIG. 4C, the second terminal is connected to the interface by the operations 120, 128, decision 130, operations 132 and 134, all described previously in connection with the capture interface sequence. Operation continues on FIG. 4E.

Turning to FIG. 4E, the operations 140, 144, 150 and 152 are executed. These operations are followed by decisions 153 and 155 which are no. All of these operations and decisions have been described previously in connection with the capture interface sequence for data transfers. Operation continues on FIG. 4G.

Turning to FIG. 4G, the second terminal places the status on the bus in as the operation 220. The status in line is raised as the operation 226. A decision 225 relative to acceptance is yes. All of these operations and decisions have been described in connection with the initial selection sequence.

The decision 225 is yes followed by the decision 227 being no. A chain command decision 229 is no. An operation 231 is executed in the event that the suppress out line had been previously raised and is up. After a 250 nanoseconds delay, the operation 262 is executed which raises the service out line.

Next, the second terminal executes the operation 234 which drops the status in line, after the decision 263 indicates that the suppress out line is not up. The first and second terminals proceed to drop the remaining lines, as shown in FIG. 4I. Before continuing, it should be noted that the operations 262 and 234 have been described in connection with the initial selection sequence. The operation 231 will be described in connection with FIG. 3J.

Turning to FIG. 3J, an AND circuit 257 is conditioned by a status cycle signal and a command chain flag off signals. Both of the signals are generated in the terminal described in previously filed application, Ser. No. 357,370. The AND circuit 257 provides an output to OR circuit 259 which operates the reset circuit of the latch 250.

Turning to FIG. 4I, the operation 236 is executed which drops the service out line. The second terminal responds to the dropping of the service out line by the dropping of the operational in line, as indicated by the operation 245. This is done after the decisions 237, 241 and 243 are no and the decision 239 is yes. The system now returns to the start polling operation 100, as shown in FIG. 4A.

Before further description, the operation 245 will be described. The operation 236 is the same as that described for the initial selection sequence. The operation 245 will be described in connection with FIG. 3G.

Turning to FIG. 3G, the OR circuit 181 is conditioned by the status cycle complete pulse. The OR circuit 181 provides a first input to the AND gate circuit. The select out and hold out signals are not present which results in a second input to the AND gate 178. Accordingly, an output is provided by the AND gate 178 to reset the latch 126 which drops the operational in signal.

For situations 2 and 3 above, the second terminal provides the status to the first terminal without receiving the stop signal from the first terminal.

*Stack status.*—Status is stacked by raising the command out line as operation **227*a* indicated in FIG. 4G. Referring to FIG. 3E, an AND gate 149 is activated by the status in signal, an operational in signal and the inverse of the OR function, which is conditioned by the status accepted by the first terminal signal and the command chaining taking place signal. The gate 149 activates the OR circuit 148** which raises the command out line.

Returning to FIG. 4G, the second terminal determines that the service out line is not raised but the command out line is raised and proceeds to stack the status as described in the flow diagram shown in FIG. 4K.

A first operation 229 drops the status in line. When the status in line drops, an operation 231 drops the operational in line. The first terminal drops the command out as operation 233 when the operational in line drops.

Before further description, it is in order to describe the operations 229, 231 and 233.

The operation 229 which drops the status in line, is executed by the logic circuit shown in FIG. 3I. The presence of the command out signal, as a result of the operation 227, (see FIG. 4G), conditions the OR gate 237 which resets the latch 228. The status in signal, thereupon, drops.

The operation 231, which drops the operational in line is executed by the logic circuits, shown in FIG. 3G. The OR gate 181 is conditioned by the status cycle complete pulse to provide a first input to the AND gate 178. The absence of the select out and hold out signals provides a second input to the AND gate 178. The AND gate 178 provides an output to the latch 126 which drops the operational in line.

The operation 233 which drops the command out line is executed by the logic circuits, shown in FIG. 3E. The AND gates 146, 147 and 149 are deconditioned by the absence of the address in, service in and status in signals, these lines being dropped in the operations 150 (see FIG. 4E), 170 (see FIG. 4J) and 229 (see FIG. 4K), respectively. Accordingly, the OR gate 148 drops the command out line.

The second terminal repeats the routine of providing the status information by returning to FIG. 4A and initiating the capture interface routine upon the appearance of the selected out signal at the initiation of a request in signal, unless suppress out is up during the polling sequence. When suppress out is up, the second terminal does not request service from the first terminal for presentation of stacked status condition.

*Suppress data.*—The suppress out line 60 (see FIG. 2) is also used to prevent data from being transmitted to the first terminal. Suppress data is indicated whenever suppress out is up during the initiation of data cycles. Suppress data is only specified for operations whose transmission rates can be adjusted without overrunning. Buffered and start-stop operations fall into this category. For these types of devices, the second terminal is designed so that the service in signal is not allowed to rise if the suppress out signal is up.

Data transfer can be suppressed by raising the suppress out line as operation 151 (see FIG. 4J) after the service in line is dropped. The second terminal proceeds to perform the operation 172 which drops the service out line. The suppress out line is raised by the circuitry, shown in FIG. 3J. The latch 250 is set by the first terminal and cannot accept more data signals. As indicated in FIG. 3C, the absence of the service in and status in lines deconditions the AND gates 166 and 167 to turn off the OR gate 168, which controls the service out line. It should be noted that the service in operation 170 is adapted to hold up service out for 250 nano-seconds after the fall of service in.

Returning to FIG. 4J, a second terminal stop decision 174 is no and operation continues on FIG. 4H. The suppress out decision 157 is yes which is followed by the buffered data decision 310 which is also yes. The select out decision 171 and burst mode decisions 173 are no. The second terminal proceeds to drop the operational in line as operation 176. Operational in drops because the data cycle complete pulse is present (see FIG. 3G). The system returns to start.

*Chained command sequence.*—The chained command sequence indicates that another command for the same *I/O* device will follow immediately upon completion of the current operation. If a chained command control has been indicated on the completion of a current operation, the indication is valid until reselection is made or until the suppress out falls. In addition, any reselecteion of any device attached to a particular second terminal will reset the chained command condition of a particular second terminal.

Turning to FIG. 4G, the suppress out line is raised as operation 260, after the decision 229 indicates a yes condition. The first terminal also raises the service out line as operation 262. When the service out line is raised, the operation 234 drops the status in line. Thereafter, the service out line is dropped as operation 236, shown in FIG. 4I, which is followed by the sequence of events in the status handling sequence previously described. The system thereupon proceeds to initiate the chained command by means of the normal selection sequence.

*Burst mode operation.*—The burst mode operation permits an *I/O* device to continue transmitting successive data bytes without an initial selection sequence for each byte as in the case of multiplex operation. Burst mode operation is usually performed by *I/O* devices having high data rates. These devices force burst mode by holding up the operational in line when attached to first terminals which normally operate in the multiplex mode. In some cases, medium speed *I/O* devices may normally work in either mode by a manual switch set to select the desired type of operation. Alternatively, the first terminal may be arranged to hold up the select out and hold out line which retains the same *I/O* device connected to the interface thus forcing the burst mode at the second terminal.

*Initial selection (burst mode).*—The initial selection procedure for burst mode is the same as that previously described for the multiplex mode, except that the select out and hold out signals remain up after operational in rises. Select out and hold out remaining up keeps the second terminal connected to the first terminal and no addressing is required for data transmission as long as select out remains up. If the second terminal is designed for burst mode, it will hold up the operational in effecting the same result. This condition occurs when the first terminal does not force burst mode.

Referring to FIG. 3A, a latch 300 is set by the presence of the address out line or the outputs from an AND circuit 302 adapted to receive the request in signal and the absence of the hold out line. An OR circuit 302 combines these outputs and provides the set signal to the latch 300. The latch 300 is reset by an OR circuit 350 having as inputs a burst operation complete pulse and a device status accepted pulse. The pulses are generated in process of first terminal operation.

As indicated in FIG. 3G, the operational in line will be held up by the latch 126 after the select out, hold out, address out and address on the bus out line signals are provided to the AND gate 123. With the operational in line held up, the first terminal will continue to service the second terminal for all the data available. The select out and hold out lines will be up during the burst operation which prevents the AND circuit 178 from resetting the latch 126.

*Data transfer (burst mode).*—In burst mode, no address is necessary for transmission to or from the first terminal. When a byte is ready for transmission to or from the first terminal, a service in signal is sent to the first terminal and the data is placed on the bus in if this is an input operation. When the first terminal has accepted the input data or has data available for output, data is placed on bus out and the first terminal sends a response on the service out line. This procedure is repeated for each byte of data as long as the operational in line remains up.

*Ending procedure (burst mode).*—The ending procedure is the same as described under Ending Procedure for Multiplex Mode, except that no reselection is required for initiating a stop sequence. If the select out line is down or dropped after receipt of the stop signal, the second terminal can disconnect from the interface by dropping the operational in line. In this case, the end status is presented to the first terminal as described for the multiplex mode.

Otherwise, if the operational in line remains up at the second terminal when the device reaches its ending point, the second terminal presents its end status to the first terminal without reselection. If the first terminal accepts the status, service out is raised and the second terminal drops operational in if select out is down. This terminates the operation of the second terminal, freeing the first terminal for a new selection.

*Stacked status (burst mode.)*—If any status information cannot be handled, the first terminal will respond with command out instead of service out which causes the stack of the status in the second terminal. When the select out drops or hold out drops, the second terminal drops operational in disconnecting from the interface. If on the other hand, select out remains up, the second terminal repeats sending in its status.

*Reset.*—Whenever the operational out line and suppress out line or down concurrently, a reset condition is indicated. This condition causes the operational in line to fall and all second terminals and their attached devices to be reset along with their status. Any *I/O* device engaged in mechanical motion will proceed to a normal stopping point.

A selective reset is indicated whenever the suppress out line is up and the operational out line drops. This condition causes the operational in line to fall and the particular device in operation and its status to be reset. Any mechanical motion that is in process will proceed to a normal stopping point, if possible. The device which was operating over the interface is the only one which is reset.

Figure 5A:
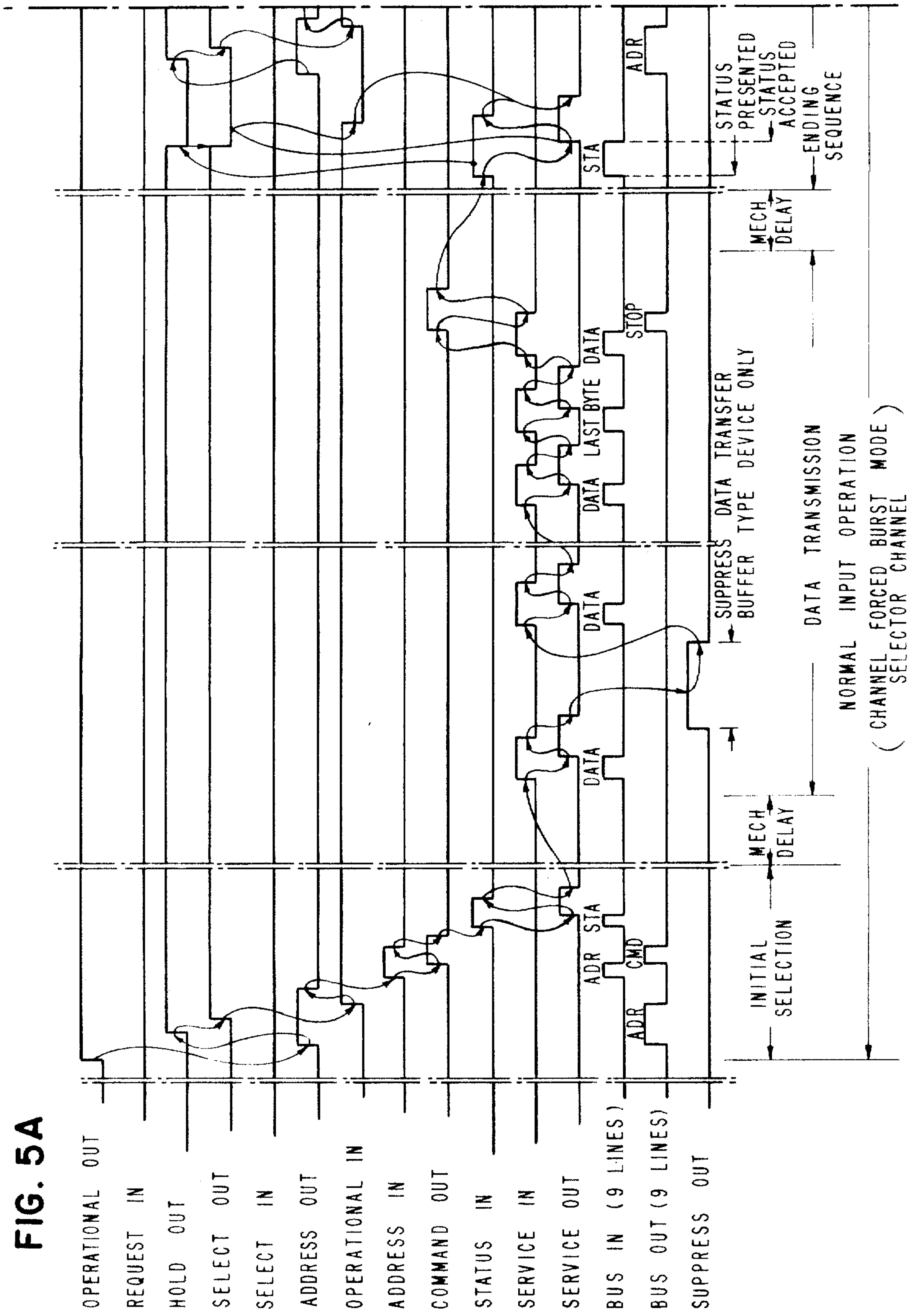
FIGS. 5A through 5D are timing diagrams for burst mode operation and FIGS. 5E and 5F are timing diagrams for multiplex mode operation of the present invention.
Figure 5B:
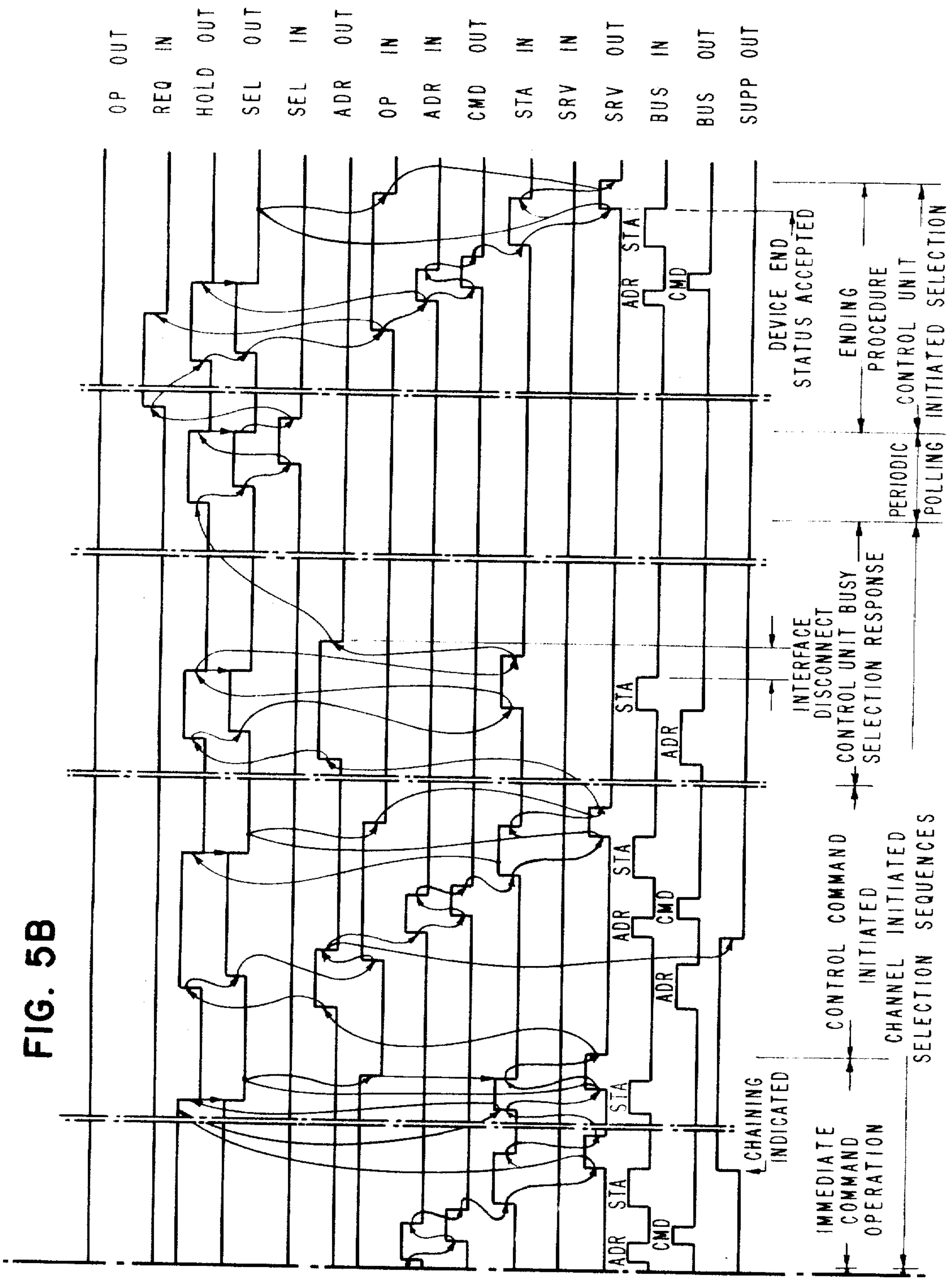
Figure 5C:
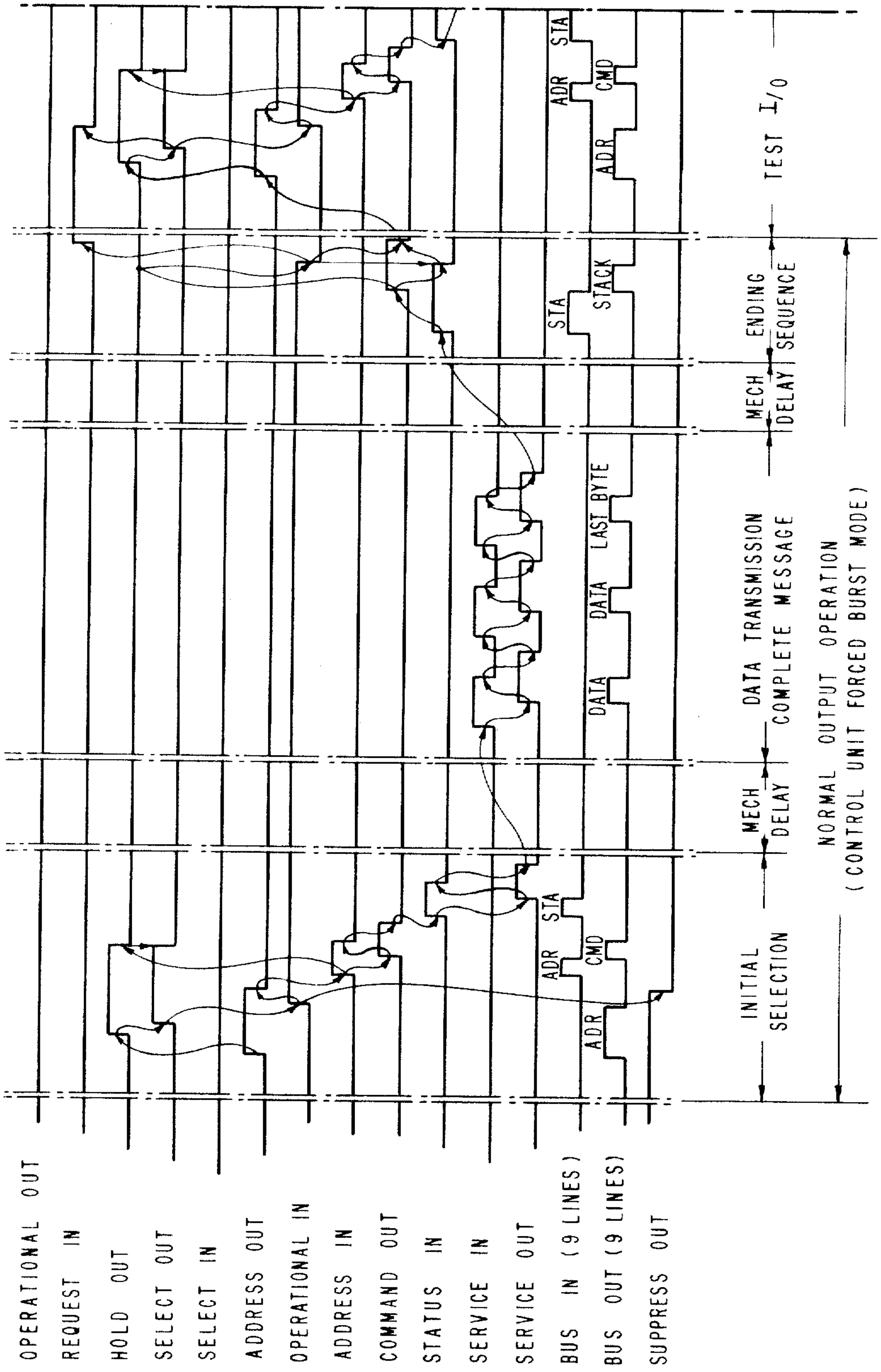
Figure 5D:
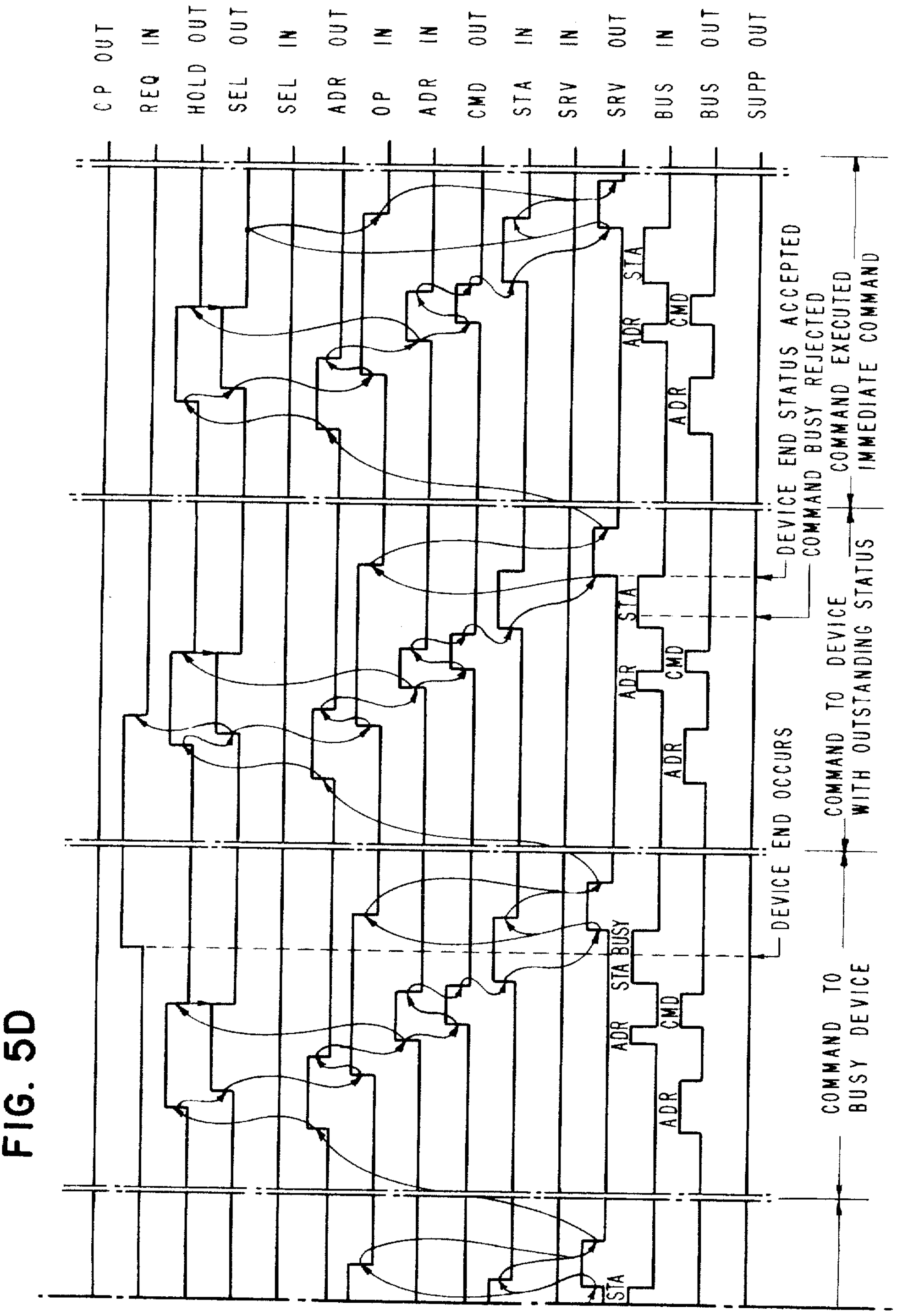
Figure 5E:
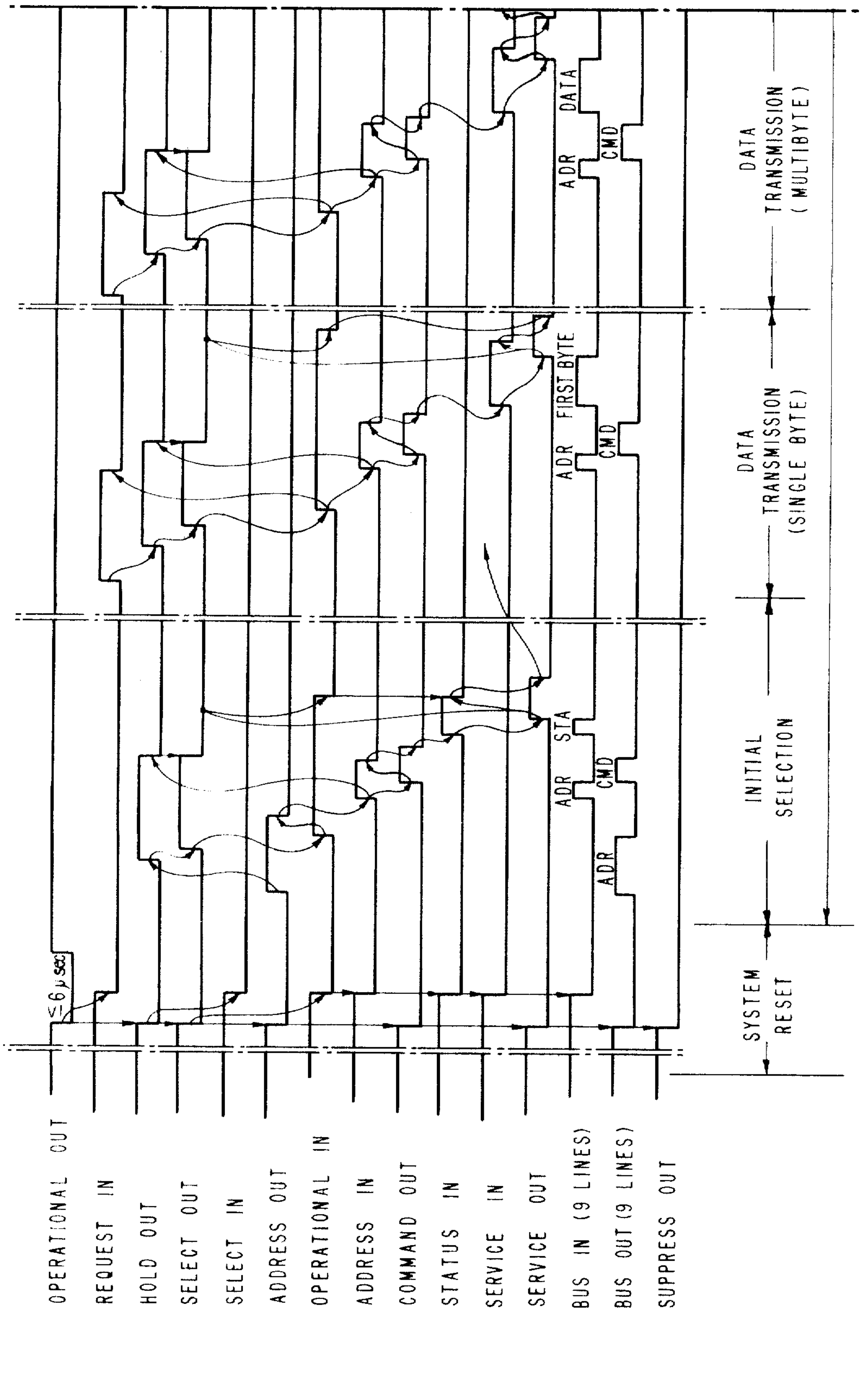
Figure 5F:
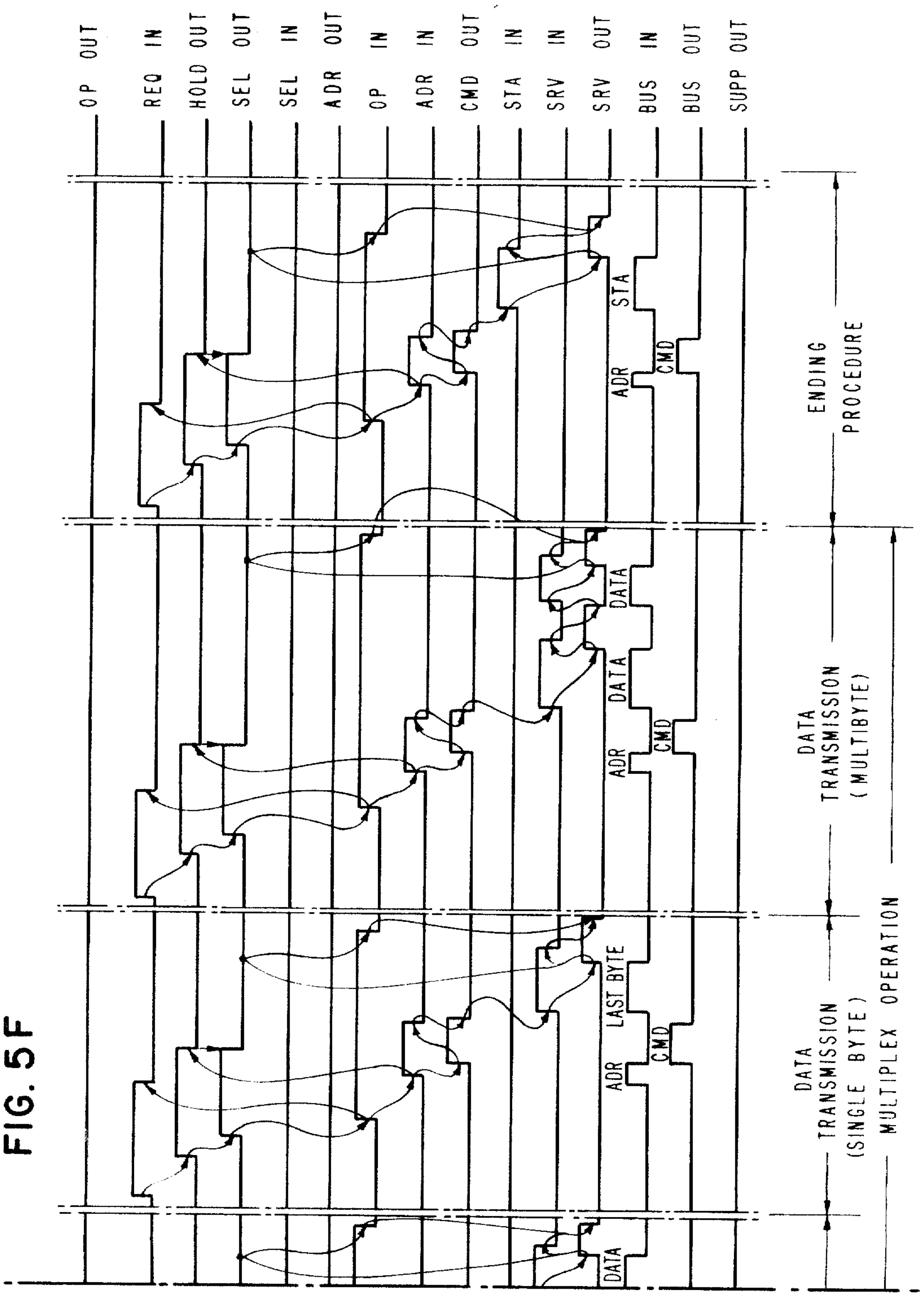

*Timing diagrams.*—Referring to FIGS. 5A to 5F, the timing sequence for transmission of data between first and second terminals is indicated for multiplex and burst mode operations, respectively. FIG. 5E describes the the multiplex mode operation. The tag and selection control lines are indicated at the left side of the figure. The bus out and bus in are also indicated. Along the lower edge of the figure, the particular interface operations are described. The arrows indicate interlock operation. It will be noted that a first or second terminal operation is responded to by a related operation by the other terminal. Thus, in the initial selection routine with the operational out line and select out line being up, the select in line falls which initiates the fall of the select out line. When the latter falls, the select in line falls, the address out line is raised in response to the fall of the select in line. The system stays set in this condition until the select out pulse is raised which causes the operational in line to be raised. The address out line falls as a result of the operational in line being raised. Select out falls again as the address in remains up. Also the comman out line is raised which is followed by the address in line being dropped. The command out line drops in response to the fall of the address in line. The status in line is raised on the fall of the command out line followed by the first terminal raising the service out line. With service out up, status in and operational in line drops, whereupon service out drops. Thus, it is believed apparent that each operation at one terminal is responsive to an associated operation at the other terminal. It should be noted that in some cases, the relation of the signals may vary. As an example, the operational in signal may fall after the fall of service out. This will not prejudice the system operation.

FIG. 5E also shows the capturing interface routine which is designated as the transmit single byte routine. The ending procedure is indicated after the transmission of the multi or last byte.

FIG. 5A shows the operation for the first and second terminals in burst mode operation. It will be noted in this type of operation the select out line remains up throughout the entire data transmission. It will also be noted that the operational in line remains up throughout this period, as contrasted with the multiplex mode where the operational in line is only raised for those intervals while information is being transmitted.

Thus, the present invention has provided a pair of first and second terminals which are interlocked with each other to permit the transfer of information therebetween. The interlock permits the terminals to operate at different speeds without loss of information. The terminals are adapted to provide and receive status information indicative of the information when transmission is terminated.

Additionally, the terminals are adapted to suppress the transfer of data therebetween. As another feature, the terminals can arrange to continue the same interconnection without a different terminal gaining control of the bus. Hence, the present invention has provided a single communication system which can handle all modes of information transmission for all types of devices without any special circuit arrangements or adapter networks.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A communication system comprising
a first information handling terminal,
a plurality of second information handling terminals,
a plurality of out lines connected between the first terminal and all second terminals, the first terminal including means for providing addresses, commands and data to the out lines for selecting, interconnecting and transferring information to a second terminal,
a plurality of in lines connected between the second terminal and the first terminal, each second terminals including means for providing addresses, status and data to the in lines for interconnecting and transferring information to a first terminal, and
a priority selection circuit connected from the first terminal to the second terminals and returned to the first terminal,
the first terminal further including means for polling the terminals whereby information is transferred over the in lines and the out lines on an interlocked basis after a second terminal and the first terminal have been interconnected.

2. The communication system defined in claim 1 wherein the in lines comprise a bus in, tag lines in and selection controls in.

3. The communication system defined in claim 2 wherein the out lines comprise a bus out, tag lines out and selection controls out.

4. The communication system defined in claim 3 wherein the tag lines in comprise an address in line, a staus in line and a service in line.

5. The communication system defined in claim 4 wherein the selection control lines in include an operational in line.

6. The communication system defined in claim 5 wherein the tag lines out comprise an address out line, a command out line and a service out line.

7. The communication system defined in claim 6 wherein the selection controls out line comprise an operational out line and a suppress out line.

8. The communication system defined in claim 7 wherein the priority selection circuit is connected in series with each second terminal, the circuit providing a signal defined as select out which returns to the first terminal as a select in signal.

9. The communication system defined in claim 8 wherein the select out signal in combination with an address out signal supplied to the bus out by the first terminal, selects a second terminal provided the first terminal has signaled on the address out and operational out lines and the second terminal recognizes the address on the bus out.

10. The communication system defined in claim 9 wherein a second terminal is connected to the first terminal by signaling on the operational in and address in lines and supplying the terminal address to the bus in before the select out and operational out signals are received.

11. The communication system defined in claim 10 wherein the information transfer between the first terminal and a selected second terminal is in a multiplex mode by terminating the select out signal after signaling on the address in line.

12. The communication system defined in claim 11 wherein the information transfer between the first terminal and a selected second terminal is in a burst mode by maintaining the select out signal throughout information transfer between the terminals.

13. An interlocked communication system comprising
(a) a first terminal including means to supply address, command and date information,
(b) a second terminal including means to supply address, status and data information,
(c) a plurality of in lines including a bus in, tag lines in, and selection controls in,
(d) said plurality of in lines connected from the second terminals to the first terminal,
(e) a plurality of out lines including a bus out, tag lines out and select in controls out,
(f) said plurality of out lines connected from the first terminal to the second terminals, and
(g) a priority selection circuit connected from the first terminal to the second terminals and returned to the first terminal,
(h) said priority selection circuit providing a select out signal which is returned to the first terminal as a select in signal,
(i) information transfer between the terminals being in a burst or multiplex mode depending upon the presence or absence, respectively, of the select out signal.

14. The interlocked communication system defined in claim 13 wherein the priority selection circuit permits only one second terminal to be selected for information transfer with the first terminal.

15. The interlocked communication system defined in claim 14 wherein information transfer between the first terminal and a second terminal only occurs after preselected sending and responding signals have been presented by the first and the second terminals.

16. The interlocked communication system defined in claim 15 wherein the tag lines out include a suppress out line and a service out line, the tag lines in including a service in line, the suppress out line suppressing information transfer between the first and the second terminals when signaled upon at the time the service out line is signaled upon.

17. The interlocked communication system defined in claim 16 wherein the tag lines out include a suppress out line and a service out line and the tag lines in include a status in line, the suppress out line indicating a chaining operation for the second terminal whenever the suppress out line is signaled upon at the time status in and service out lines are signaled upon.

18. A communication system comprising
a first information handling terminal,
a plurality of second information handling terminals,
a plurality of out lines connected between the first terminal and all second terminals, the first terminal including means for providing addresses, commands and data to the out lines for selecting, interconnecting and transferring information to a second terminal,
a plurality of in lines connected between the second terminal and the first terminal, each second terminal including means for providing addresses, status and data to the in lines for interconnecting and transferring information to the first terminal, and
a priority selection circuit including a select out line and a hold outline connected from the first terminal to the second terminal, the select out line connected in series with each second terminal and returned to the first terminal, the hold out line connected in parallel to the second terminals,
the priority selection circuit including means for signaling on the select out and hold out lines to poll the terminals whereby information is transferred over the in lines and out lines on an interlock basis after a second terminal and the first terminal have been interconnected.

19. The communication system defined in claim 18 wherein the in lines comprise a bus in, tag lines in and selection controls in.

20. The communication system defined in claim 19 wherein the out lines comprise a bus out, tag lines out and selection controls out.

21. The communication system defined in claim 20 wherein the tag lines in comprise an address in line, a status in line and a service in line.

22. The communication system defined in claim 21 wherein the selection control lines in include an operational in line and a request in line.

23. The communication system defined in claim 22 wherein the tag lines out comprise an address out line, a command out line and a service out line.

24. The communication system defined in claim 23 wherein the selection controls out line comprise an operational out line and a suppress out line.

25. The communication system defined in claim 24 wherein a signal on the select out line and hold out line in combination with an address out signal supplied to the bus out by the first terminal, selects a second terminal, provided the first terminal has signaled on the operational out and the address out lines and the second terminal recognizes the address on the bus out.

26. The communication system defined in claim 25 wherein a second terminal is connected to the first terminal by signaling on the request in line, operational in line and address in line and supplying the terminal address to the bus in before the select out, hold out and operational out signals are received.

27. The communication system defined in claim 26 wherein the information transfer between the first terminal and a selected second terminal is in a multiplex mode by terminating the select out and hold out signals after signaling on the address in line.

28. An interlocked communication system comprising:

(a) a first terminal including means to supply address, command and data information, (b) a plurality of second terminals including means to supply address, status and data information, (c) a plurality of in lines including a bus in, tag lines in and selection controls in, (d) said plurality of in lines connected from the second terminals to the first terminal, (e) a plurality of out lines including a bus out, tag lines out and select in controls out, (f) said plurality of out lines connected from the first terminal to the second terminal, and (g) a priority selection circuit including select out and hold out lines connected from the first terminal to the second terminal, (h) said selection controls line out and tag lines out being signaled upon after the hold out and select out lines have been signaled upon to select one of the second terminals after a selection control line in and tag lines have been signaled upon, the hold out and select out signals being terminated at the time the tag line in is terminated.

29. An interlocked communication system comprising (a) a first terminal including means to supply address, command and data information, (b) a plurality of second terminals including means to supply address, status and data information, (c) a plurality of in lines including a bus in line, tag lines in and selection controls in, a request in line included in the selection controls in, (d) said plurality of in lines connected from the second terminals to the first terminal, (e) a plurality of out lines including a bus out, tag lines out and selection controls out, (f) said plurality of out lines connected from the first terminal to the second terminal, and (g) a priority selection circuit including a select out line and a hold out line connected from the first terminal to the second terminals, (h) a second terminal being connected to the first terminal by signaling on the request in line after the selection controls out, select out and hold out lines have been signaled upon, whereupon the second terminal signals upon a selection control line in followed by terminating the request in signal and supplying address information to the first terminal before the select out and hold out signals terminate.

30. The communication system defined in claim 29 wherein the select out line is sequentially connected to the terminals to establish priority thereamong and returned to the first terminal as a select in line.

31. The communication system defined in claim 30 wherein a hold out line is connected to the second terminals connected in parallel.

No references cited.

ROBERT C. BAILEY, *Primary Examiner.*

O. E. TODD, JR., *Assistant Examiner.*